US005220943A

United States Patent [19]

Zink

[11] Patent Number: 5,220,943

[45] Date of Patent: Jun. 22, 1993

[54] INTERNAL PUMP ASSEMBLY

[75] Inventor: Donald L. Zink, Billings, Mont.

[73] Assignee: Montana Sulphur & Chemical Co., Billings, Mont.

[21] Appl. No.: 750,391

[22] Filed: Aug. 27, 1991

Related U.S. Application Data

[62] Division of Ser. No. 594,171, Oct. 9, 1990.

[51] Int. Cl.[5] ........................ A01M 7/00; F16K 24/00

[52] U.S. Cl. .................................... 137/565; 137/347; 137/587; 251/335.3; 417/375; 417/401

[58] Field of Search ................................ 137/347-350, 137/565, 571, 587; 417/375, 401; 251/335.3

[56] References Cited

U.S. PATENT DOCUMENTS

| | | | |
|---|---|---|---|
| 1,474,297 | 11/1923 | Simpson . | |
| 1,507,098 | 9/1924 | Walker . | |
| 1,555,005 | 9/1925 | Gunther | 137/454.6 |
| 1,566,814 | 12/1925 | Bliss . | |
| 2,009,102 | 7/1935 | Bern . | |
| 2,040,776 | 5/1936 | Marvin | 251/335.3 |
| 2,109,870 | 3/1938 | Thwaits | 137/21 |
| 2,538,111 | 1/1951 | Luster | 417/375 |
| 2,606,571 | 8/1952 | Ernst . | |
| 2,630,181 | 3/1953 | Solvin | 92/140 |
| 2,770,255 | 11/1956 | Goddard | 251/335.3 |
| 2,822,823 | 2/1958 | Klein et al. | 251/230 X |
| 2,841,359 | 7/1958 | Berck . | |
| 2,867,193 | 1/1959 | Ayers | 92/129 |
| 2,882,008 | 4/1959 | Giauque | 251/61 |
| 2,888,037 | 5/1959 | Jones et al. | 251/335.3 |
| 2,925,987 | 2/1960 | Priesmeyer | 251/335.3 |
| 2,969,801 | 1/1961 | Cummins | 137/81.1 |
| 2,988,916 | 6/1961 | Waugh | 73/861.77 |
| 3,065,949 | 11/1962 | DeFrees | 251/62 |
| 3,096,077 | 7/1963 | Forsyth | 92/120 X |
| 3,101,094 | 8/1963 | McKenzie | 251/335.3 |
| 3,115,894 | 12/1963 | Marx | 137/576 |
| 3,164,358 | 1/1965 | MacSporran . | |
| 3,199,534 | 8/1965 | Shaw et al. . | |
| 3,204,631 | 9/1965 | Fields | 417/375 |
| 3,257,093 | 6/1966 | DeFrees | 251/61 |
| 3,345,915 | 10/1967 | Dotto | 137/624.14 X |
| 3,388,719 | 6/1968 | Maginnis . | |
| 3,392,956 | 7/1968 | DeFrees | 251/144 |
| 3,430,644 | 3/1969 | Lymby | 251/230 X |
| 3,480,034 | 11/1969 | Jerome | 251/230 X |
| 3,548,872 | 12/1970 | Jago . | |
| 3,556,465 | 1/1971 | Little | 251/61.1 |
| 3,636,767 | 11/1972 | Duffy | 73/861.77 |
| 3,687,570 | 8/1972 | Ellison . | |
| 3,791,230 | 2/1974 | Webb | 74/128 |
| 3,910,551 | 10/1975 | DeFrees | 251/144 |
| 3,934,612 | 1/1976 | Kast . | |
| 3,945,770 | 3/1976 | Welker | 417/401 |
| 3,981,325 | 9/1976 | Robinson et al. | 137/587 |
| 3,986,525 | 10/1976 | Slaughter, Jr. . | |
| 4,036,476 | 7/1977 | Dove et al. | 74/128 X |
| 4,052,036 | 10/1977 | Schertler . | |
| 4,062,515 | 12/1977 | Bobo | 251/335.3 |
| 4,106,749 | 8/1978 | Behle | 251/144 |
| 4,114,636 | 9/1978 | Behle | 137/43 |
| 4,237,927 | 12/1980 | Stoller et al. | 137/587 |
| 4,280,679 | 7/1981 | Shaw . | |
| 4,517,580 | 7/1985 | Chheda | 137/565 |
| 4,526,341 | 7/1985 | Thomas | 251/335.3 |
| 4,657,223 | 4/1987 | Lindgren . | |
| 4,752,445 | 6/1988 | Zell . | |

FOREIGN PATENT DOCUMENTS

| | | | |
|---|---|---|---|
| 3703117 | 10/1987 | Fed. Rep. of Germany | 73/861.77 |
| 1262796 | 4/1961 | France | 92/129 |
| 882201 | 11/1961 | United Kingdom | 137/624.14 |

*Primary Examiner*—A. Michael Chambers
*Attorney, Agent, or Firm*—Banner, Birch, McKie & Beckett

[57] ABSTRACT

An internal pump assembly including a fluid tank defining a fluid compartment, and first and second vessels positioned in the tank. The second vessel has a second vessel port through which fluid can flow relative to the fluid compartment. A bellows pump assembly positioned at least partially in the first vessel pumps fluid from the fluid compartment through the second vessel port into the second vessel from which the fluid can be subsequently removed. The fluid in the compartment acts on the bellows surface to thereby bias the pump assembly towards one of a pumping or a non-pumping position.

28 Claims, 11 Drawing Sheets

INTERNAL PUMP ASSEMBLY

This application is a division of application Ser. No. 07/594,171, filed Oct. 9, 1990 pending.

BACKGROUND OF THE INVENTION

The present invention relates to internal safety valves for fluid containment vessels. It also relates to positive displacement metering pumps for fluid transport vessels.

Society today requires that numerous chemical materials be handled, many of which have hazardous or obnoxious properties. These materials include acids, alkalies, chlorine, ammonia, liquefied petroleum gases, hydrogen sulfide, hydrogen cyanide, sulfur dioxide, mercaptans, fuels, pesticides, radioactive materials, and industrial wastes. To insure that these hazardous, obnoxious, or valuable or sensitive materials do not escape into the environment during their processing, storage and transportation they must be contained in strong vessels or piping systems. These vessels and piping systems must not only provide satisfactory access to the contained materials, but must completely and safely contain them at all times when the escape thereof to the outside environment is unsafe or otherwise undesirable. In some cases, it is even desirable to protect the material itself from the environment.

The unintentional escape of such substances from their containers can have disastrous consequences, including the loss of life, damage to health or property, public inconvenience and even the mass evacuation of public areas. Accordingly, there is a strong need to provide safer containment systems. Although totally sealed vessels providing no access to the outside can be designed to be highly reliable, access to the materials stored in them is of course necessary. Valves with or without mechanical actuator devices to operate them are therefore provided. The containment vessels are typically reliably built, and it is the traditional valvings thereof which are the weak points in the system and thereby reduce the reliability and usefulness of the entire containment system.

In some instances, relatively large leaks or seepage rates from valves are tolerated by users and by society depending upon the particular location and the state, pressure and properties of the stored materials whether hazardous or nonhazardous. However, in the case of extremely toxic, reactive, obnoxious, valuable or sensitive materials even small failures of containment or seepages can be so objectionable as to discourage or even preclude the handling, transportation or storage of them. This problem is growing due to the public's increasing anxiety over the handling of chemical and radioactive materials by both industry and government. Materials which exist in normal conditions as high pressure or liquefied gases are particularly troublesome especially if the materials have a foul odor or corrosive properties. Seepages may not even approach hazardous levels before the users of the materials are exposed to adverse publicity, litigation and extremely stringent and costly regulations. When valve systems used with hazardous, obnoxious or valuable materials fail, the release of the materials can thus have potentially lethal and costly consequences. This failure can result from highway accidents, fires, explosions, earthquakes, storms, misuse, abuse and vandalism.

Known valve systems typically comprise a moveable plug assembly or port which can be manipulated relative to a valve seat to open or close the valve. This manipulation is usually done by transferring a mechanical force from outside of the valve to the plug or seat by means of a valve stem passing through a packing gland or a mechanical seal. These seals or glands are dependent upon tight mechanical closures, and they invariably leak to some measurable extent. These valves also are subject to relatively rapid friction wear causing the seals thereof to ultimately fail. Another known valve apparatus is that disclosed in U.S. Pat. No. 4,872,640. The entire contents of that patent, of each of the references cited therein and any other patents mentioned anywhere in this disclosure are hereby incorporated by reference.

Most known valves are designed such that if they are to be operated in response to instrumentation or personnel, they must be installed outside of their containment vessel, usually on a nozzle or an attached pipe. While the valve body itself might be capable of withstanding external exposure to the contained material, the operators extant cannot withstand such materials or hard pressure. They characteristically are designed to operate in gentle conditions of temperature, pressure and atmosphere. Accordingly, valves and valve actuators are now usually placed outside of the containment vessel, accessible to personnel. This positioning means, however, that the valve is relatively vulnerable to mechanical damage and damage by impacts, fires, abuse and so forth which would not necessarily damage the containment vessel itself. Further examples of valves positioned generally inside of fluid vessels include those shown in U.S. Pat. Nos. 1.474,297, 3,164,358, 3,199,534, 3,388,719, 3,986,525 and 4,280,679.

To make the valves less vulnerable and more resistant to some types of external hazards, such as fire, protective shielding is sometimes used. Its use is generally limited, however, and for transportation vessels, it typically increases the vehicle's weight unacceptably.

Specialized internal excess flow valves have been designed to at least partially remedy this vulnerability problem. These valves close automatically using the system or product pressure at preset flow rates. They do not communicate with the outside environment and cannot be controlled externally. By necessity they are designed not to close unless the rate of flow exceeds the maximum expected flow requirements of the system. They are not adjustable as to response without entry into the vessel. Unfortunately, the nonadjustability of these valves and the need to set a flow level higher than the maximum expected flow limits their usefulness. Further, unintentional escapes of material through leaky or partially broken external systems can result in dangerous or obnoxious releases to the environment at flow rates considerably less than the maximum expected flow rates. As a result, these valves protect only against unlikely circumstances involving total downstream failure.

The vulnerability problem has been addressed in a few cases by installing the seat and plug portions of the valve within the tank or vessel envelope and placing the mechanical linkage on the outside of the tank envelope. These valves have shaft or stem seals outside of the tank envelope, and they are vulnerable to physical impact as well as to stem seal seepage. The theory is that the external portions of the valve can be broken or shorn off in an accident and the internal plug and seat will remain intact. This is unlikely however due the actual mechanical stem linkage of the external system to the internal system. Furthermore, in actual practice, this mounting arrangement is easily damaged when impacted, leaving the system totally unprotected and apt to leak.

The seal or gland leakage problem has been partially addressed in some known devices by using bellows or diaphragm seals on the stems of otherwise conventional valves, or by using magnetically-transparent rigid seals through which magnetic forces are transmitted to mechanically manipulate the valve plug or seal; these valves are generally referred to as electromagnetic solenoid valves. In the case of the bellows or diaphragm seal, the seals are intrinsically weak to accommodate the low forces provided by conventional valve actuators and intrinsically small to fit into conventional valve geometries. They are therefore subject to damage by relatively small forces and cannot withstand the environmental rigors inside containment vessels.

Electromagnetic solenoid valves are limited to small sizes and low pressure operating ranges due to the practical limitations on the power or force output of reasonably small magnetic actuators. These devices attempt to solve the problem of limited force by means of pilot valves. The ports of these pilot devices though are very susceptible to plugging with foreign matter and require that the fluid being contained have a minimum pressure differential relative to the downstream pressure in order for the valve to move or even to reliably stay in one position. Electromagnetically generated forces, furthermore, utilize electric currents sufficient to generate sparks, and therefore are often not suitable for use around flammable or explosive mixtures. No known devices of this type have the stated ability to operate within high pressures or the high pressure containment vessel itself.

Valves which are to be operated or controlled from the outside of the vessel are typically designed to be installed outside of the vessel in whole or in significant part as previously stated. This leaves the valve highly vulnerable to accidental damage and susceptible to seal leakage particularly for high pressure systems. A practical solution to the problem of externally controlling the action of a valve when the valve is fully contained within a pressure vessel in a manner which prevents even seepage leaks from the control device itself was not previously known.

SUMMARY OF THE INVENTION

Accordingly, a principal object of the present invention is to provide an improved valve design for fluid containment vessels, which valve is essentially leak free and is less susceptible to damage.

Another object of the present invention is to provide an improved externally-controllable, positive-displacement metering pump for fluid transport vessels.

A further object of the present invention is to provide an improved pumping system without packing gland or seal leakage problems.

A still further object of the present invention is to provide an improved internal valve désign for pressure fluid vessels, which valve is operable and adjustable from outside of the vessel.

Directed to achieving these objects, an internal safety valve and pump system is herein disclosed. This system is adapted to be mounted within a fluid vessel such as a high pressure fluid transport vessel. It includes a compressible bellows assembly positionable within the vessel, a valve seat through which fluid can flow relative to the vessel, a valve member movable relative to the valve seat between an open position wherein fluid can flow through the valve seat and a closed position wherein fluid is blocked from flowing through the valve seat and a pressure transmitting conduit through which pressure can be transmitted from the compressible bellows assembly to the valve member to thereby move the valve member to the open position. The compressible bellows assembly is positioned within a first vessel within the fluid containment vessel and the valve member and the valve seat are positioned in a second smaller vessel also within the fluid containment vessel. The bellows system includes a piston-cylinder arrangement having a chamber with an inlet communicating with the fluid in the fluid containment vessel and an outlet communicating with the fluid or pressure transmitting conduit. The piston-cylinder arrangement then sucks fluid into the inlet into a cylinder cavity and forces it out through the outlet into the second vessel from which the fluid can subsequently be removed. This system thereby acts as a positive displacement metering pump. A spring bellows relief assembly positioned in the second vessel biases the valve member to its closed position against the working pressure of the fluid in the fluid containment vessel. The bellows system includes a sealed bellows within which the piston cylinder is positioned. The interior of the sealed bellows communicates to a passage with the fluid pressure in the vessel and the fluid pressure biases the piston cylinder to a raised position. A source of pressurized fluid outside of the vessel controllably pushes the piston cylinder to its down position. This up and down movement then pumps the fluid to the second vessel through the fluid or pressure transmitting conduit.

In other words, disclosed herein is an internal valve and metered positive displacement pump for a pressure fluid tank. The tank defines a fluid compartment, and first and second vessels are positioned within the protective envelope of the tank. A bellows pump assembly disposed in the first vessel includes a bellows and a piston cylinder arrangement positioned within and attached to the bellows. Pressurized fluid is pumped into and out of the first vessel to actuate the piston cylinder arrangement. With this actuating movement fluid is pumped from the compartment through a valve in the second vessel and into the second vessel for removal therefrom. The valve is normally closed against the working pressure of the fluid in the compartment by a spring bellows relief assembly in the second vessel. The force of the fluid pump by the piston cylinder arrangement opens the valve, and a check valve prevents fluid from flowing back from the valve into the first vessel. A passageway through the first vessel allows the pressurized fluid in the compartment to bear on the bellows and thereby bias the piston cylinder arrangement to an up (or down) position.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE PRESENT INVENTION

Figure 1:
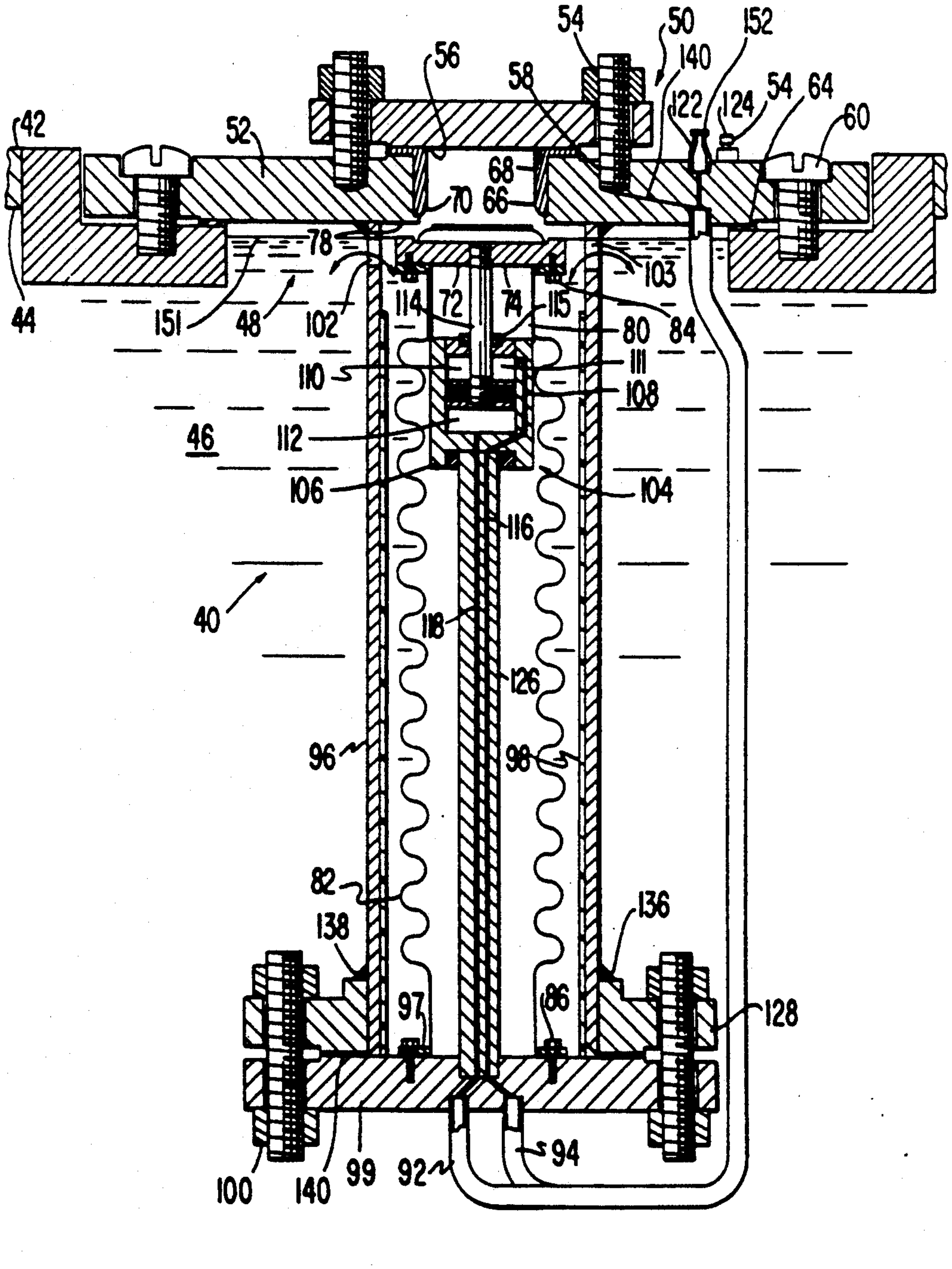
FIG. 1 is a cross-sectional view of an internal valve of the present invention.
Figure 2:
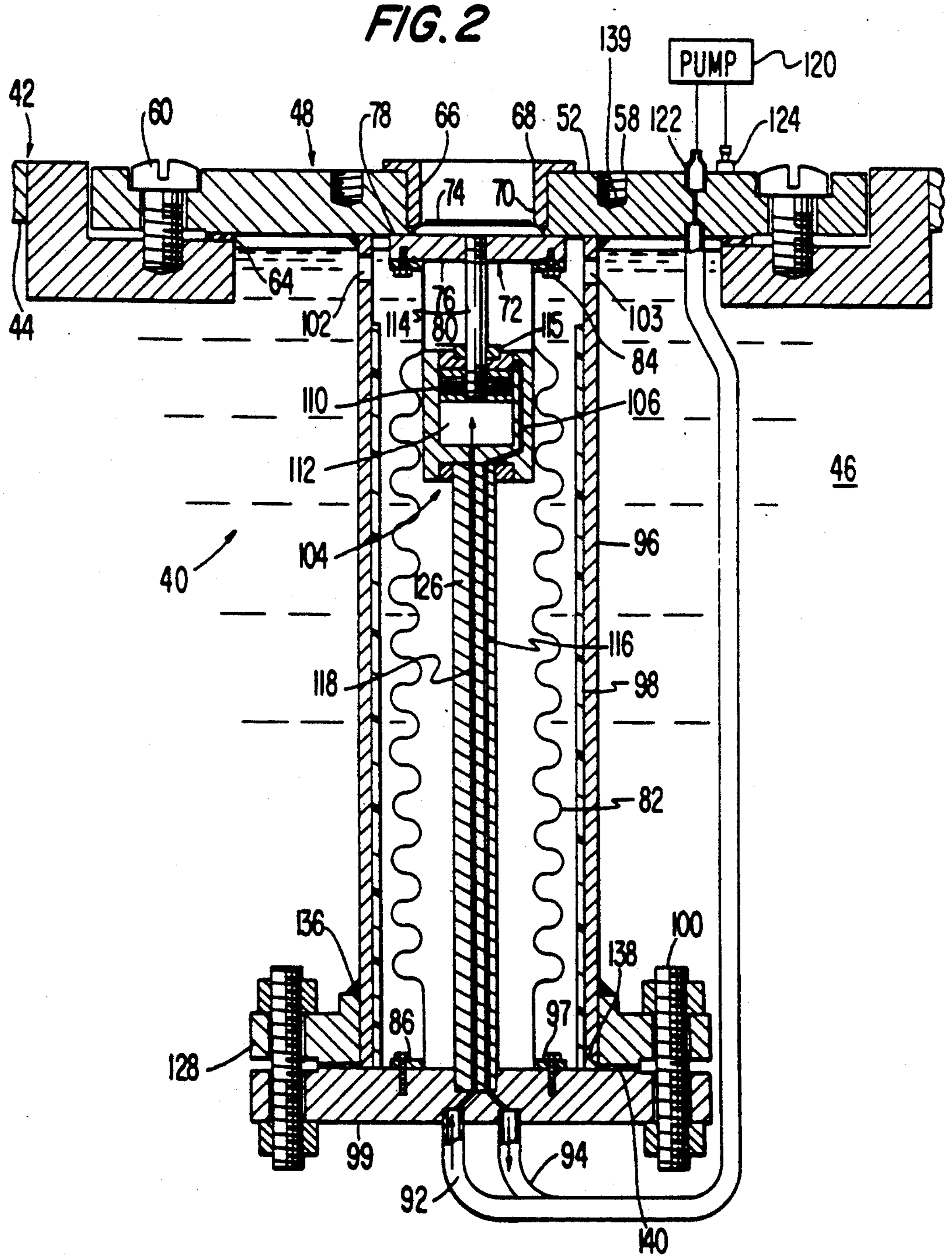
FIG. 2 is a cross-sectional view of the valve of FIG. 1 illustrated in its closed position and with the mounting flange thereof removed.

Referring to FIGS. 1 and 2 an internal valve system of the present invention is illustrated generally at 40. Valve system 40 is mounted in a pressurized, hot or corrosive fluid containment vessel shown generally at 42 having a vessel or shell wall 44 with the interior thereof filled with a (pressurized) fluid 46, such as hydrogen sulfide pressurized at four hundred to five hundred pounds per square inch, for example. The vessel 42 can be any transportation vessel such as a tank car, a tank truck, a tank cylinder or any stationary vessel.

The vessel outlet is illustrated generally at 48 and is closable by a blind flange 50, as shown in FIG. 1, secured to a mounting flange 52 of the shell wall 44 by bolt fasteners or cap screws 54 and with a suitable gasket 56 sandwiched therebetween. These fasteners 54 are threaded into tapped blind holes 58 in the mounting flange 52. The closing flange 50 is applied for shipment purposes and is removed, as illustrated in FIG. 2, for valve operation.

The mounting flange 52 is mounted flush with the exterior wall 44 of the pressure vessel 42 by means, for example, of a plurality of Allen head cap screws 60. This provides a desirable protective flush mounting of the mounting flange 52 to the exterior of the vessel 42 with a different wrench configuration than is needed for the removal of the blind flange 50 in accessing the valve discharge port. A gasket 64 between the mounting flange 52 and the vessel wall 44 forms a seal therebetween. By unscrewing the screws 60 the entire valve 40 can be easily removed from the vessel 42 for servicing, adjustment or replacement. This mounting arrangement also makes the installation of the valve 40 from outside of the vessel 42 relatively easy. Alternatively, the mounting flange 52 can be a part of the shell wall 44 and not removable with respect thereto. In such case, the valve 40 is affixed to the vessel wall 44 and is not removable from the vessel 42 from the outside thereof.

A valve seat 66 is threadably mounted into the flange outlet 68 and can be unscrewed therefrom by means of a simple wrench (not shown) and removed for maintenance purposes. The removable seat 66 is sealed to the mounting flange 52 by means of an O-ring system 70, or by adhesives, sealants or gaskets. Alternatively, the seat 66 can be constructed as part of the mounting flange 52 itself in which case it would not be a separately renewable component.

A valve plug assembly shown generally at 72 includes a plug member 74 formed of a replaceable resilient material and configured to mate tightly with the valve seat 66. The plug member 74 is removably mounted on a support member 76, which is preferably metallic, and which provides a secondary, tight metal-to-metal contact around the circumference of the seat at location 78 in the event of the loss of or damage to the primary resilient plug material. This sealing arrangement is best shown in FIG. 2. This resilient material is selected to be compatible with the fluid 46 to be contained in the vessel 42. In the case of hydrogen sulfide this resilient material can be glass or carbon filled Teflon, for example.

The plug assembly 74 is mounted upon or forms one end of a control chamber 80. The sides of the control chamber 80 are formed by a bellows cylinder 82 which in turn is attached to the other end of the control chamber 80. The ends of the bellows cylinder 82 are attached as by threaded studs 84, 86 at the two ends of the chamber 80 and sealed by O-rings 88 and 90. Gasketed joints can be eliminated by forming the entire bellows-and-internal double acting cylinder assembly as a single welded construction. The chamber 80 is thus completely sealed from the fluids 46 of the vessel 42 and from the exterior of the vessel 42 except for the communication provided by the control lines 92 and 94.

The bellows cylinder 82, which defines the walls of the control chamber 80, can be of standard manufacture and its construction material should be compatible with the fluid 46 of the vessel 42. Stainless steel is an example of a possible compatible material, and other strong flexible metal, plastic or rubber materials can also be used, and the bellows can be formed of a laminated or multilayer construction. Examples of known bellows-piston valves are those shown in U.S. Pat. Nos. 2,009,102, 2,841,359, 3,687,570, 4,657,223 and 4,752,445. The bellows cylinder 82 will be of a sufficient strength to withstand the internal pressure of the vessel 42 and of a sufficient length to allow for the movement of the plug assembly 72 over its full stroke length without undue fatigue even after tens of thousands of cycles. The bellows cylinder 82 is preferably always in compression to some extent and never in extension. This prevents "snaking" thereof which is a characteristic of bellows in extension. The bellows cylinder 82 in compression acts as a spring biasing the plug assembly 72 to a closed position as shown in FIG. 2. The spring rate of the bellows cylinder 82 can be selected to overcome the forces exerted thereon by the fluid 46 in the vessel interior, if desired.

Alternatively, the valve 40 can be designed to be in a normally "open" position by shortening the bellows cylinder 82 slightly or moving it a slight distance away from the valve seat 66. This, however, puts the bellows cylinder 82 in extension during closing, which is less desirable, as previously discussed. More preferably, the seat/plug configuration can be altered to allow the valve 40 to be open when the bellows cylinder 82 is relaxed and closed when compressed.

A rigid support cylinder 96 is securely welded to the mounting flange 52 at its upper end and thereby rigidly connects the chamber 80 relative to the vessel wall 44. The support cylinder 96 provides guiding and stabilizing functions and also protectively envelopes the critical bellows cylinder 82. Contact wear between the bellows cylinder 82 and the support cylinder 96 can be minimized by providing a Teflon sleeve 98 within the support cylinder 96. The bellows cylinder 82 is mechanically fastened to the support cylinder 96 at the end opposite from the plug assembly 72 by any convenient fasteners such as the studs 86. This fastening system is sealed by an O-ring 97 to an end mounting plate 99 which is bolted by bolts 100 to the support cylinder 96. This mounting provides for the control chamber 80 by fixing it at one end such that the linear expansion of the chamber 80 causes the movement of the plug assembly 72 towards and subsequently against the valve seat 66. The support cylinder 96 is not a sealed unit however, and passage for the fluid 46 of the vessel 42, as indicated by the arrows in FIG. 1, is provided by ports 102 and 103 therethrough conveniently located at the top (or bottom) of the support cylinder 96.

A standard double-acting piston assembly shown generally at 104 is used in valve 40 and includes a cylinder or housing 106 defining a cavity 108, a piston 110 slidable within the cavity and defining on opposites sides thereof first and second chambers 111, 112, and a piston rod 114 secured at one end to the piston 110 and at the opposite end thereof to the plug assembly 72, and passing through the housing 106 through a piston seal 115. The control lines 116 and 118 communicate with the chambers 111 and 112, respectively, and are controlled from outside of the vessel. This control is accomplished by means of applying a pressurized fluid, as by means of a pump shown schematically in FIG. 2 at 120, to one or both of the external hydraulic fittings 122, 124. These hydraulic fittings 122, 124 are shown offset for ease of convenient explanation but in the preferred design they are aligned into the plane of FIGS. 1 and 2. The pump 120 therefore can pressurize one fitting 122 (or 124) while depressurizing the other fitting 124 (or 122). The pump 120 supplies any suitable type of pressurized fluid, such as hydraulic fluid, pressurized grease or pressurized gas.

The control lines 116, 118 pass through an elongated member 126 within the bellows cylinder 82 and which is threadably secured at its upper end to the housing 106 and at its lower end to mounting plate 99. The mounting plate 99 in turn is secured by bolts 100 to a cylinder flange 128 welded by welds 136 and 138 to the outside and bottom, respectively, of the support cylinder 96. A suitable gasket 140 is sandwiched therebetween to form a good seal.

An optional safety feature of this valve is illustrated in FIGS. 1 and 2. A small connecting passage 142 is provided between one or both of the control lines 92, 94 where they pass through the mounting flange 52 and the blind flange stud hole 58. The stud 60 is replaced with a special cap screw 146 (see FIG. 3). When this cap screw is loosened or improperly tightened, fluid will escape past the gasket 139 at the bottom of the stud hole 58 causing the lines 92 or 94, if they are pressurized, to depressurize. This allows the plug assembly 72 to move towards its relaxed position, which in the case of the valve design illustrated in the drawings is its closed position.

Figure 3:
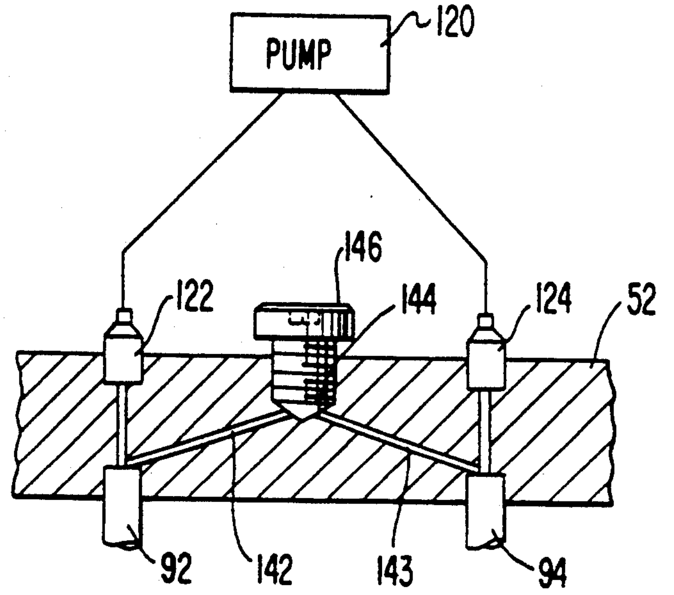
FIG. 3 is an enlarged cross-sectional view of an alternative fitting arrangement for the valve of FIG. 1.

Alternatively, two passages 142, 143, one from line 116 and the other from line 118, can converge upon one (or more) of the stud holes 58 of the blind flange 52, as depicted in FIG. 3. Normally sealed from each other and outside by a gasket 144 when the cap screw 146 is properly applied, the two passages 142 are connected together when the cap screw 146 is loosened. This loosening allows the pressure in both chambers 111, 112 of the double-acting piston assembly 104 to equalize and thereby allows the normally closed valve to move to its closed position as the bellows cylinder 82 relaxes. The normally closed characteristic is determined by the length and spring rate of the bellows cylinder 82. In a normally closed configuration, the spring rate is selected to overcome the force exerted thereon by the maximum vessel working pressure as effected by the fluid pressure through the ports 102, 103.

Figure 4:
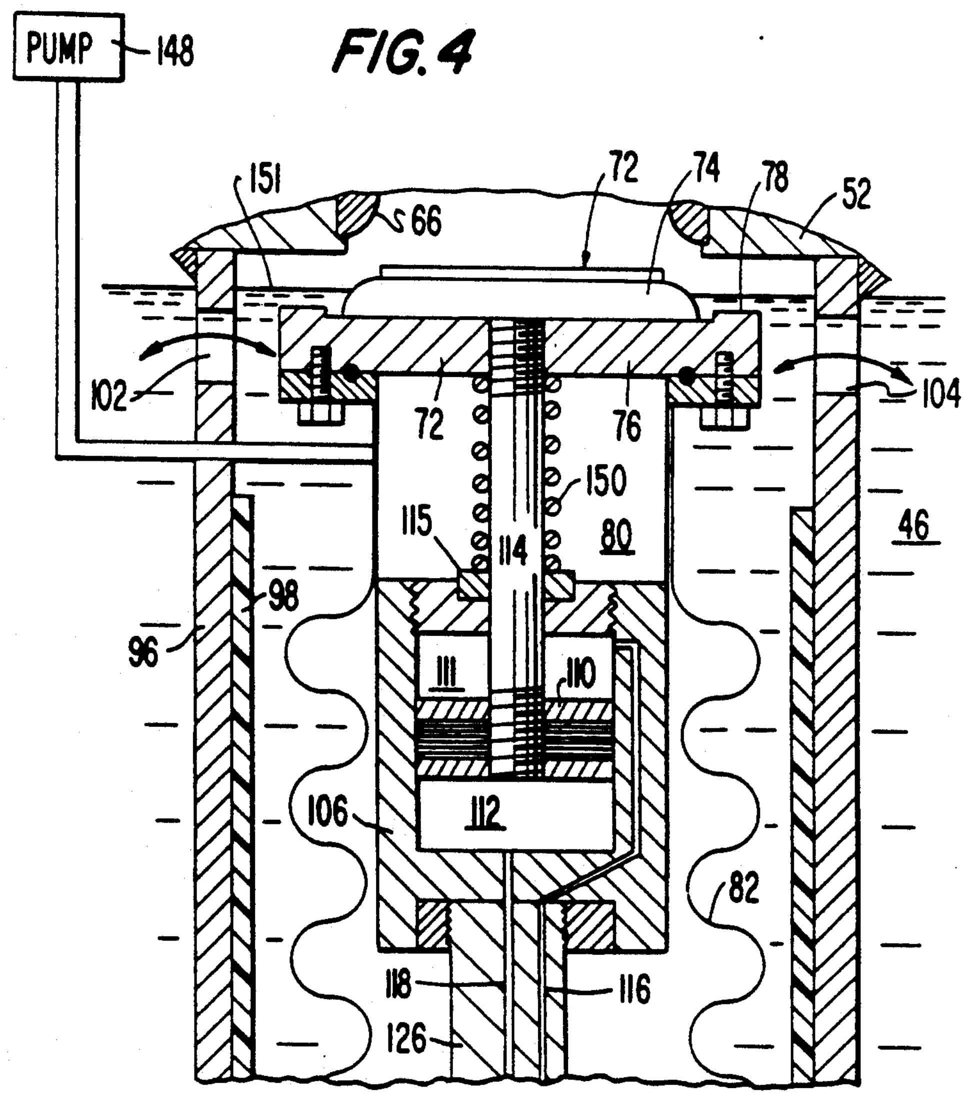
FIG. 4 is an enlarged sectional view of an alternative of the pressurized chamber and plug of the valve of FIG. 1.

It may be desirable to provide by separate means outside of the vessel 42 for the direct pressurization of the control chamber 80 with a pressurized fluid, either a gas or liquid, from a pump such as is shown schematically at 148. This arrangement is partly shown in FIG. 4 and can assist in the closing of the valve plug assembly 72. One connection of the pump 148 to the chamber 80 is illustrated in FIG. 4. A preferred connection, however, and referring to FIG. 1, has it pass down through mounting flange 52, outside of the support cylinder 96 and up through the end mounting plate 99 into the control chamber 80. It thereby provides an alternate means for forcing the valve shut. It can also provide a means of externally monitoring both the integrity of the seal and the valve position. By selecting different spring lengths and/or rates, a normally open valve mechanism with a similarly configured valve, with or without optional separate springs, as mentioned above can be constructed. If separate springs are desired they can be placed inside of the control chamber 80, as illustrated in FIG. 4 at 150, to avoid exposure to the vessel fluid 46.

A positive closure of the plug assembly 72 can be assisted by the pressure in the vessel itself. This closure is further assisted by the double-acting piston cylinder 104 which can be easily pressurized by the user through lines 116, 118 to force the valve plug assembly 72 closed tightly against the valve seat 66. When the vessel 42 is a transportation vessel, the loading/unloading valve 40 would normally be closed for transportation and left closed except when actually needed to gain access to the interior of the vessel.

The safety relief port(s), if any, of a transportation vessel or any other pressure vessel would typically be equipped with a normally open internal valve, and such valve would be left open except in unusual circumstances wherein it is desirable to be able to completely isolate a safety relief valve for repairs. Pressure relief valve systems on pressure vessels can be further improved using this type of internal valve which has been modified so that it is shipped in a closed position and automatically opens on high pressure in the vessel and can be reclosed, if desired. This can be done by providing a mechanism (not shown), such as a bellows or piston, in the vessel which uses internal vessel pressure to pressurize the fluid needed to open the valve, as by putting pressure on tube 94 in FIG. 2 for example. This mechanism allows the valve to be automatically opened when the vessel pressure rises above a predetermined limit.

This valve 40 when properly installed on a pressure vessel 42 can be easily removed from the vessel by trained personnel without entering the vessel. Only depressurization and suitable personal protective clothing need be worn by the personnel if the valve 40 is mounted above the liquid level 151 in the vessel 42.

Furthermore, this valve 40 is fully protected from fire, impact, abuse, corrosion, weather and so forth by the shell of the vessel wall 44 itself. All of the externally protruding parts, such as the hydraulic fittings 122, 124, the blind flange 52 and blind flange bolts 54 can be removed, either accidently or intentionally, with the valve 40 in the closed position, without any vessel fluid 46 escaping.

The valve 40 has no packing or other frictional seals to leak. Even failure of the substantial and external bellows seals, while unlikely if properly designed, does not result in either the valve 40 being rendered inoperable or in the vessel fluid 46 being lost to the environment. Failure of the bellows cylinder 82 results in the pressurization of the bellows control chamber 80 only which tends, according to the preferred design herein, to close the plug assembly 72. The vessel contents must still pass by the highly reliable piston seal 115, enter the cylinder or housing 106 and pass through the resident control fluid before arriving at the hydraulic fittings 122, 124. These fittings, when not in use, are preferably sealed with caps 152, 154, as shown in FIG. 1. When in use the fittings 122, 124 are connected to the high pressure pump 120 which further makes leakage difficult. The fittings 122, 124 themselves preferably contain automatic valves which prevent the flow of fluid except when connected to hydraulic pump lines. These multiple lines of secondary leakage defenses ensure that leakage through the control mechanism is essentially impossible, which is a significant improvement over existing valves. This valve 40 can be remotely controlled easily either manually or automatically using standard control instrumentation. For example, the valve 40 can be easily made to close on excess flow, loss of line pressure or tank car movement, or in the event of fire or downstream disruption.

Figure 6:
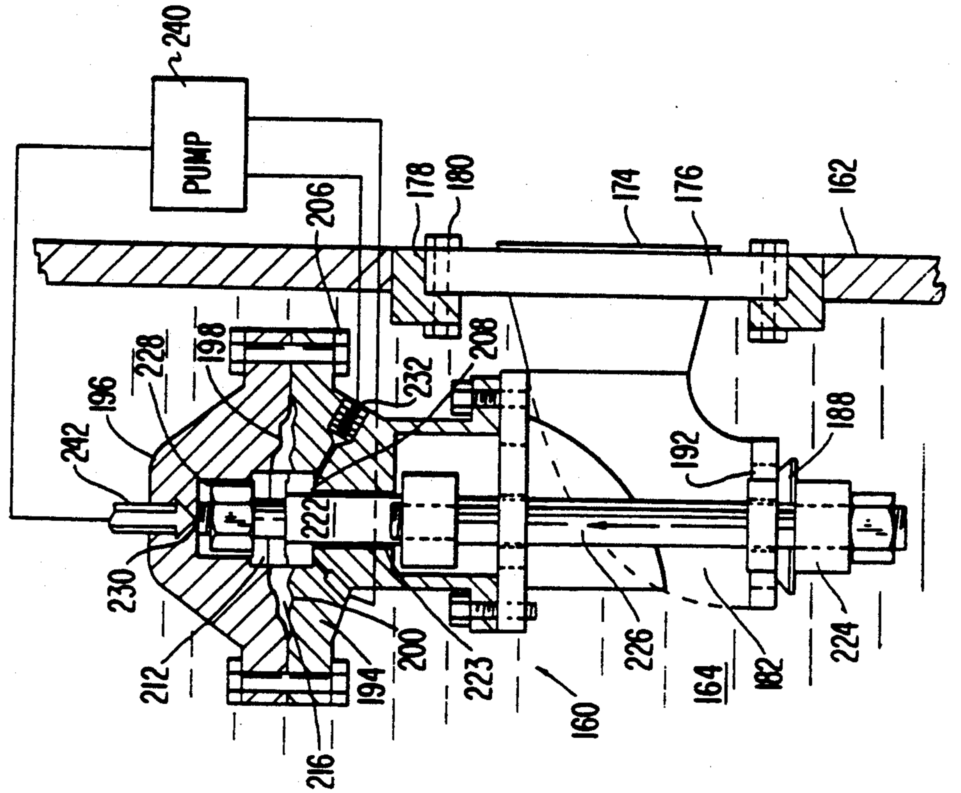
FIG. 6 is a view of the valve of FIG. 5 illustrated in its closed position.
Figure 5:
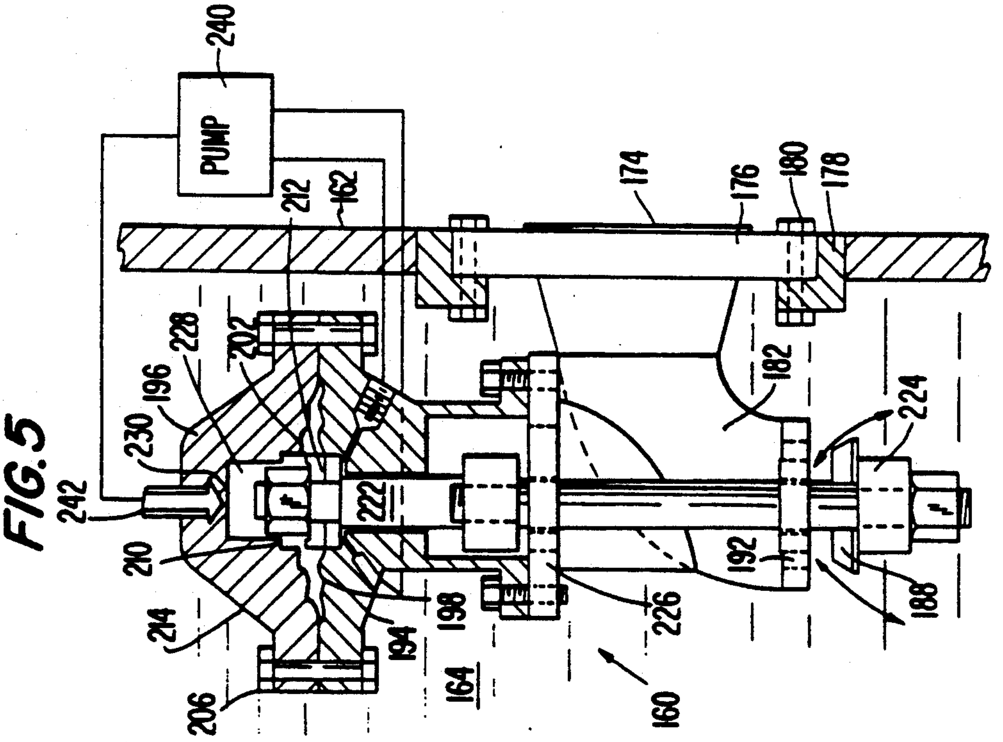
FIG. 5 is a side partially sectional view of another internal valve of the present invention illustrated in an open position.
Figure 7:
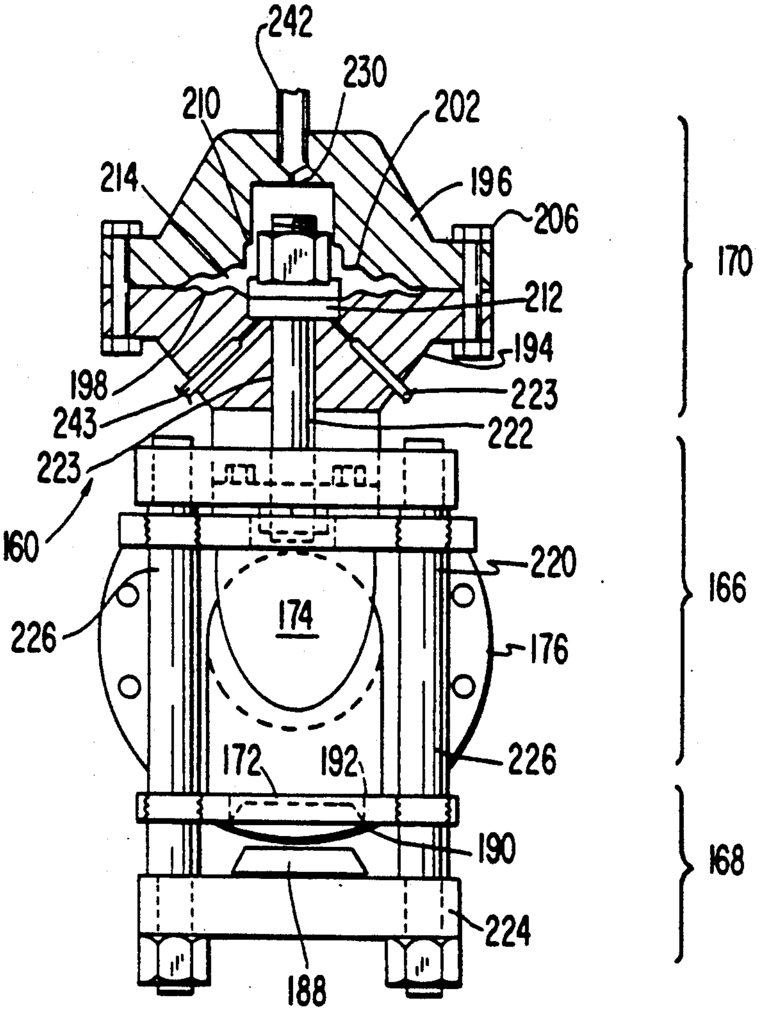
FIG. 7 is an end partially sectional view of the valve of FIG. 5.

Another valve of the present invention is illustrated in FIGS. 5–7 generally at 160. Valve 160 similarly is designed to be contained within a fluid containment compartment of a pressure vessel shown generally at 162. The vessel 162 typically is adapted to contain fluid 164, either gas or liquid, and usually under pressure, and can be a tank car, highway tanker, stationary vessel, cylinder or the like. As illustrated in FIG. 7, the valve comprises a valve body portion 166, a valve portion 168 and valve actuation portion 170, as designated by the respective brackets in that drawing. The preferably metal valve body portion 166 includes an inlet opening 172 and an outlet opening 174 positioned at the rear of the valve 160 through the flange 176. The flange 176 is bolted to the wall 178 of the vessel 162 by bolts 180. The flange 176 can be omitted and the valve 160 welded or otherwise suitably attached directly to the exit nozzle or piping leading to the exterior of the vessel 162.

The valve portion 168 defines a cavity 182 within the valve body portion 166 and disposed between the inlet and the outlet openings to form a passage within the body portion 166. A valve member or plug 188 is disposed adjacent to the cavity 182 and movably engageable with the sealing surface of the opening. The inlet opening 184 is preferably provided with a replaceable valve seat member 192.

The valve actuating portion 170 includes lower and upper body sections 194 and 196. The lower body section 194 may, but need not, be constructed as one piece with the valve body portion 166. Instead of a bellows sealing element as was provided in the embodiments of FIGS. 1 and 2, a diaphragm sealing element 198 is preferably used for valve 160. The diaphragm sealing element 198 must be sufficiently flexible over at least a part of the surface thereof to allow for the operation of the valve over a useful service life without undue fatigue. The surfaces 200, 202 of the body sections 194, 196, respectively, are preferably shaped or molded to evenly conform to and completely support the diaphragm sealing element 198 at its two extremes of travel as is apparent from a comparison of FIGS. 5 and 6. The diaphragm sealing element 198 is formed of a strong flexible material, such as metal (e.g., stainless steel), plastic or rubber, suitable for exposure to the fluid 164 in the vessel 162 and to the control fluid. It preferably has a laminated or multi-layered construction. The diaphragm sealing element 198 is sealed between the body sections 194 and 196 with a gasket between itself and the body section 196. The body sections 194 and 196 are held firmly together by any convenient means, as by bolts 206.

The surfaces 208 and 210 of the body sections 194 and 196 are shaped to support and limit the movement of the piston or pressure plate 212 at its two intended extremes of travel, as is apparent from FIGS. 5 and 6. The pressure plate 212 is attached firmly to the diaphragm sealing element 198 to form a gasketed seal, so that no fluid communication is possible between the variable volume upper and lower chambers 214, 216. The pressure plate 212 has an effective cross-sectional area in the chamber which is substantially greater than the cross-sectional area of the valve port area circumscribed by seat member 192.

One end of a connecting section 220 is firmly attached to or is a part of the piston assembly and includes a rod 222 passing through a passageway 223 in the body section 196 towards valve body passage 182. This passageway 223 is preferably aligned with the valve inlet opening 172 of the valve body portion 162.

Connecting section 220 has one end thereof operatively connected to the movable valve member 224. Connecting section 220 preferably has a yoke portion 226 secured to the rod 222. The yoke portion 226 attaches at one end to a movable valve section 224 as shown and at its opposite end to the rod 222, which in turn is connected to the pressure plate 212. Less advantageously, the connecting section 220 can connect directly to the movable valve member 224 by passing through a seal (not shown) and into and through chamber 182. If this direct connection is made, the seal used can be another bellows or diaphragm to minimize the possibility of any leakage.

The application of force to the surface of the pressure plate 212 facing the variable volume chamber 228 is transmitted directly by connecting section 220 to the movable valve member 224 and thereby to the plug 188 causing the plug to move towards the extreme open position shown in FIGS. 5 and 7 as the volume of the chamber 182 increases towards it maximum. The force can be applied to the pressure plate 212 by any convenient means through the upper passageway 230 in the body section 196. Valve closure can also be assisted by applying pump pressure through port 232. In this case, the lower chamber 216 is preferably sealed from the fluid of the vessel to thereby effectively form a second control chamber. The force preferably is applied by injecting a pressurized fluid from a pump as shown schematically in FIGS. 5 and 6 at 240. The pump 240 can be a source of compressed gas or hydraulic fluid which is introduced into chamber 228 through passage 230 in the connecting channel or tubing 242 leading to the outside of the pressure vessel 162.

Figure 8:
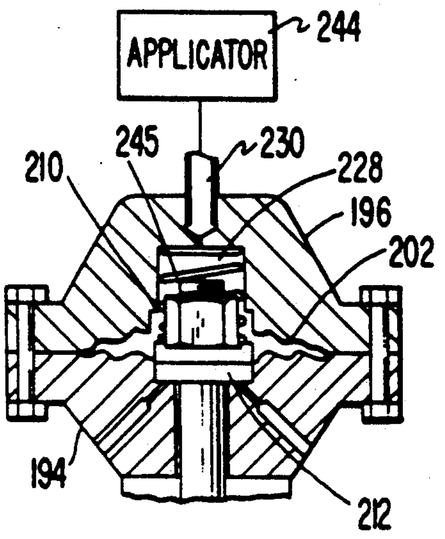
FIG. 8 is a sectional view of the upper portion of the valve of FIG. 7 illustrating a variation thereof.

An alternative method of applying force to the pressure plate 212 is illustrated in FIG. 8. It is seen therein that the force is applied by applying heat to a suitable fluid contained in the variable volume chamber 228 and/or passageways 230, 243 causing thermal expansion and pressurization within the cavity or passage. The heat can be delivered to the fluid by means of steam or suitably limited electric power conducted to the actuator through one or more sealed conductors via channel or via electric induction through a magnetically-permeable metal wall. A control mechanism thus need not penetrate the vessel wall. In this manner a non-flexing, highly reliable secondary barrier to the inadvertent escape of vessel contents can be provided since the secondary conductor tubes can readily be sealed from both the contents of chamber and the exterior world and since the means of delivering energy can also be readily sealed from the outside environment. Such a system does not allow escape of the vessel contents even in the unlikely event of diaphragm or channel failure.

Alternatively, and perhaps less advantageously, the force can be applied by means of a fixed or movable, solid push/pull rod or screw passing directly to the outside of the vessel through the passageway 230 and the channel 242. (Examples of known screw jack valves are shown in U.S. Pat. Nos. 1,474,297, 1,507,098 and 1,566,814.) Alternatively, the passageway can contain an electrically-driven gear motor or solenoid device which applies force to the pressure plate 212 and is powered by conductors traveling through the channel 242 to the exterior of the vessel 162. The power sources and/or force applicators mentioned in this paragraph are shown generically and schematically in FIG. 8 at 244. Applicator 244 can be either inside or outside of the vessel and can develop its pressure entirely based on heat. It is also within the scope of this invention to provide a tension or compression spring 245 in the chamber 228 to bias the pressure plate 212 up or down, as desired.

When the valve 160 is to be moved to its open position as shown in FIGS. 5 and 7, force is applied to the pressure plate 212 by any of the means described herein and preferably controlled from outside of the vessel 162. This force causes a downward movement of the pressure plate 212, the connecting section 220 and the movable valve section 226 and the plug 188, thereby opening up inlet opening 172 and allowing the vessel fluids to flow unimpeded through the valve and outlet piping of the vessel 162. When the valve 160 is to be closed or moved to its position as shown in FIG. 6, the applied force is removed. The vessel pressure is exerted through closing passages 243 and 244 against the underside of the pressure plate 212, the diaphragm sealing element 198 and also against the valve portion causing the valve portion, the connecting section 220 and the piston 222 to move towards the opposite extreme position (the up or raised position as shown in FIG. 6), thereby diminishing the size of the variable volume chamber 228. This movement closes the valve 160. If the pressure in the vessel 162 is insufficient to close the valve 160 under anticipated conditions, then a spring 245 as shown in FIG. 8 can be used to assist in the closure process. This spring 245 preferably is placed within the chamber 228 (and passage 230), operatively connected to the piston 212 and connecting section 222 and still protected by the diaphragm sealing element 198 from any contact with the fluid in the vessel 162. (In the illustrated case, the spring is in extension when the valve is open.)

The configuration of the valve 160 as illustrated in the drawings is normally closed. It is also within the scope of the present invention, however, to modify this valve so that it is normally open by a number of simply modifications in the relationship of the plug to the seat and the actuator to the valve. Further, the valve 160 illustrated in FIGS. 5–7 is not intended to be removable from the outside of the vessel 162, in contrast to the valve 40 illustrated in FIGS. 1 and 2. Rather, it must be installed and serviced by actually entering the vessel 162.

Figure 9:
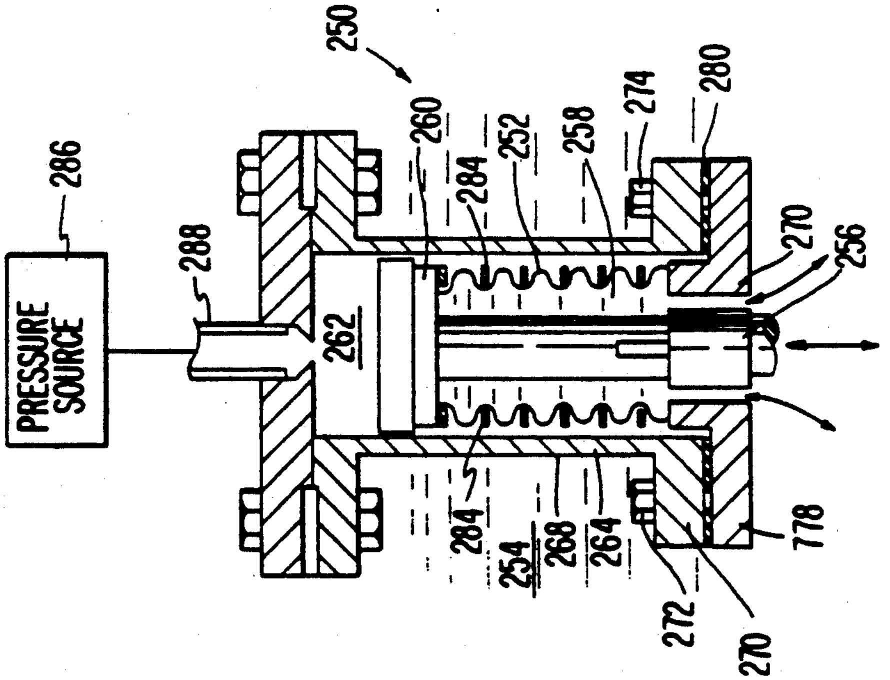
FIG. 9 is a cross-sectional view of another internal valve of the present invention.

Referring to FIG. 9 another valve design of the present invention is illustrated generally at 250. The sealing section of the valve actuator portion of this valve 250 differs from the sealing section of the valve actuating portion of the valve 160 in FIG. 5–7 in that a bellows 252 is utilized instead of a diaphragm sealing element 198. This valve 250 is similarly intended for installation within the envelope of a pressure vessel.

In use, pressure from the contained vessel fluid 254 (gas or liquid) flows around the rod member 256 into the cavity 258 within the bellows 252 and against the underside of the piston or pressure plate 260 mounted on top of the rod member 256. The top of the bellows 252 is affixed and sealed to the pressure plate 260. A pressure cavity 262 is formed by the body 264 of the actuator, the bellows 252 and the pressure plate 260. The bellows 252 is affixed and sealed at its bottom end to the body 264, and the other bellows end and the pressure plate 260 are free to move up and down in the sealed cavity 262. There is no fluid communication between the cavity 262 and interior of pressure vessel which contains this valve 250. The body portion 264 can be made in one piece or preferably, as shown, as an assembly comprising two or more pieces 268, 270 connected by bolts 272, 274 through their flanges 276, 278 and sealed by a gasket 280 sandwiched therebetween.

The bellows 252 is preferably selected so that its fully relaxed length is no shorter than the length of the interior of the cavity 262 such that the bellows is always at least somewhat compressed in length regardless of the position of the pressure plate 260 within the cavity. This minimizes any natural "snaking" or distortion characteristic of the bellows in extension when exposed to higher internal and external pressures. Furthermore, in order to insure and maintain the correct alignment of all of the corrugations of the bellows 252 during operation, spacer washers or rings 284 can be positioned in the grooves between the corrugations.

The neutral or relaxed position of this actuator of the valve 250 of FIG. 9 is with the pressure plate 260 at the top of the cavity 262, being held there by the natural spring action of the bellows 252 and by the pressure of the internal vessel fluid 254, as previously described. Pressurized control fluid from a pressure source as shown schematically at 286 is introduced into the cavity 262 from outside of the vessel via conduit 288. This pressurized control fluid overcomes the natural spring characteristic of the bellows 252 and the internal pressure of the vessel fluid 254 exerted on the inside of the bellows 252 and against the bottom surface of the pressure plate 260 and moves the plate towards the bottom of the cavity 262 thereby compressing the bellows 252. The connecting rod member 256 which is attached to the piston 260 on the inside of the bellows 252 transmits force and linear movement to a valve assembly (not shown in FIG. 9) which can be similar to the valve section of FIGS. 6-8, for example. If attached in place of the actuator portion of FIG. 2, this actuator would produce a normally closed valve design with or without the assistance of vessel pressure and/or springs. A normally open configuration can also be readily produced as would be apparent to one skilled in art.

Normally open and closed versions of the externally removable valve apparatus described in FIG. 1, for example, can also be readily constructed using this simpler form of the bellows actuator rather than the more positive bellows sealed, double-acting cylinder arrangement illustrated in FIG. 1. The valve 250 of FIG. 9 form of actuator depends upon spring action, either from the bellows 252 itself or from separate assisting springs, and/or the internal pressure of the vessel to move it to one of its two extreme positions. This is in contrast to the double-acting piston cylinder 104 described and illustrated in FIG. 1 which can be moved positively to any position and held there by means of external pressure if desired.

Any other suitable means of applying the force, including any of the various alternative means of applying force to the piston 212 of FIGS. 6-8 (the diaphragm sealed actuator embodiment), can be readily used to apply force to the piston of the bellows actuator in FIG. 9 with similar results.

Figure 10:
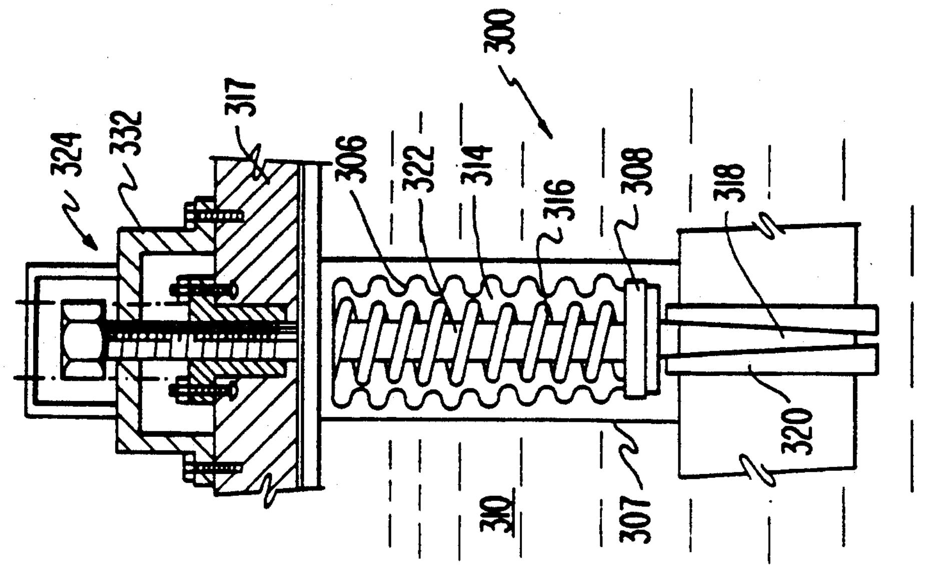
FIG. 10 is a side sectional view of another valve of the present invention.
Figure 11:
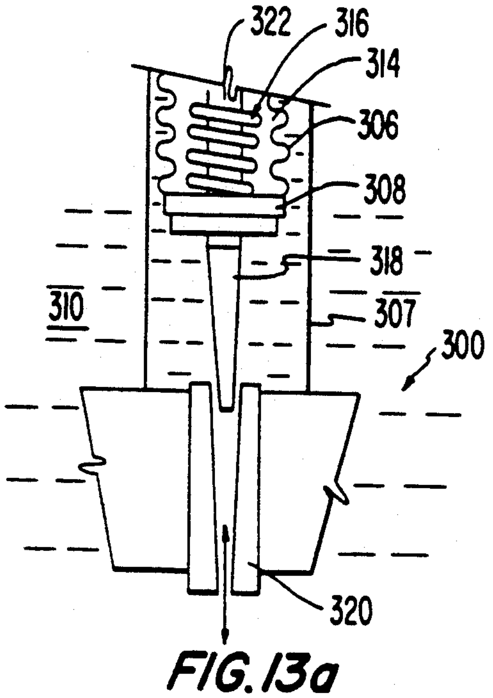
FIG. 11 is an enlarged view of the lower portion of the valve of FIG. 10 illustrating the valve in an open position.

A gate valve apparatus of the present invention is illustrated generally at 300 in FIGS. 10 and 11. This apparatus 300 has a valve actuating portion that includes a flexible sealing section, such as a bellows 306, of sufficient flexible length to allow for a long cycle life without fatigue failure and positioned within a tube 307. A piston or pressure plate 308 is positioned at the lower end of the bellows 306, and fluid 310 in the pressure vessel bears against the outside of the bellows 306, rather than the inside thereof as in the valve 250 of FIG. 9. The upper end of the bellows 306 is attached and sealed to the wall of the vessel containing this valve 300 thereby creating a chamber 314 inside of the bellows 306 which is isolated from the fluid 310 of the vessel and which can be isolated also from contact with the external world if desired.

The downward force applied to the pressure plate 308 from within the chamber 314 can overcome forces, such as the pressure of the fluid 310 or the spring forces from the optional internal biasing spring 316, which can tend to compress the bellows 306 and cause the pressure plate 308 to move away from the wall 317 of the vessel. This piston motion moves the gate valve member 318 which is operatively affixed to the end of the piston into engagement with a seating section 320 of the valve, as best shown in FIG. 10. It is also within the scope of this invention to position the spring outside of the control chamber as might be done in the embodiment of FIG. 9.

Figure 12:
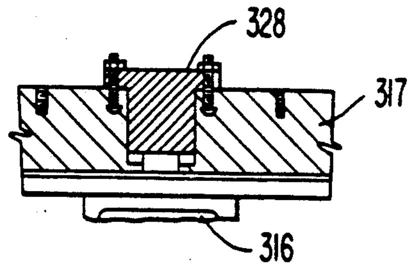
FIG. 12 is an enlarged view of the top portion of the valve of FIG. 10 with the top shield portion thereof removed and a cap inserted therein.

Removal of this downward force and/or application of an upward force on the pressure plate 308 causes the bellows 306 to compress and the pressure plate 308 to move upwards towards the wall 317 of the vessel and thereby opening the gate valve member 318; this open position is illustrated in FIG. 11. The externally applied force can be applied, in either direction, to the pressure plate 308 by means of an optional connecting member 322 passing between the pressure plate 308 and the exterior through the chamber 314 within the bellows 306 and to the wall 317 of the vessel. A simple hand-operated screw jack, as shown in FIG. 10 at 324, can be used to develop the upward or downward force as desired and applied to the connecting member 322 and to the pressure plate 308. Preferably, all portions of the hand-operated screw jack 324 protruding beyond the wall 317 of the vessel 312 can be removed prior to shipment or when not in use. The passage through the vessel wall 317 into the chamber 314 of the bellows 306 can then be sealed with a preferably flush mounting plug when not in use, as shown in FIG. 12 at 328. A seal can be positioned on or within the wall of the vessel 312 on the connecting member 322 to further protect against the inadvertent escape of vessel fluid 310 should the sealing bellows 306 fail.

A housing, as shown in FIG. 10 at 332, positioned outside of the vessel 312 can be provided, and an alternative force applying means, as shown schematically at 334 in FIG. 13, such as a solenoid, a motor, or a double acting cylinder, situated within this housing. Alternatively, this force applying means 334 can be positioned on the interior side of the vessel wall, or within the chamber 314 formed by the seal of the bellows 306. This alternate force applying means 334 can be operatively connected to the pressure plate 308 by way of the connecting member 322.

Figure 13A:
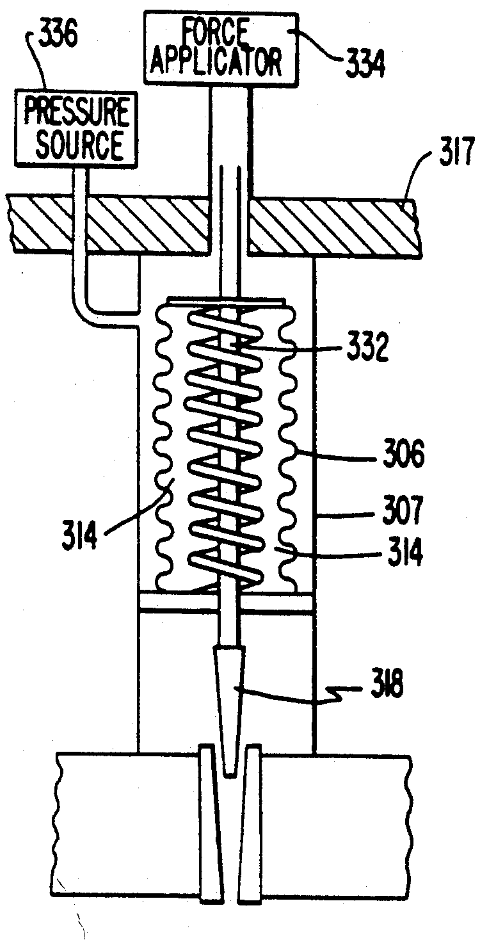
FIG. 13*a* is a view of a valve similar to that of FIG. 10 showing the plug insert configuration and with the sealed volume outside the bellows.
Figure 13B:
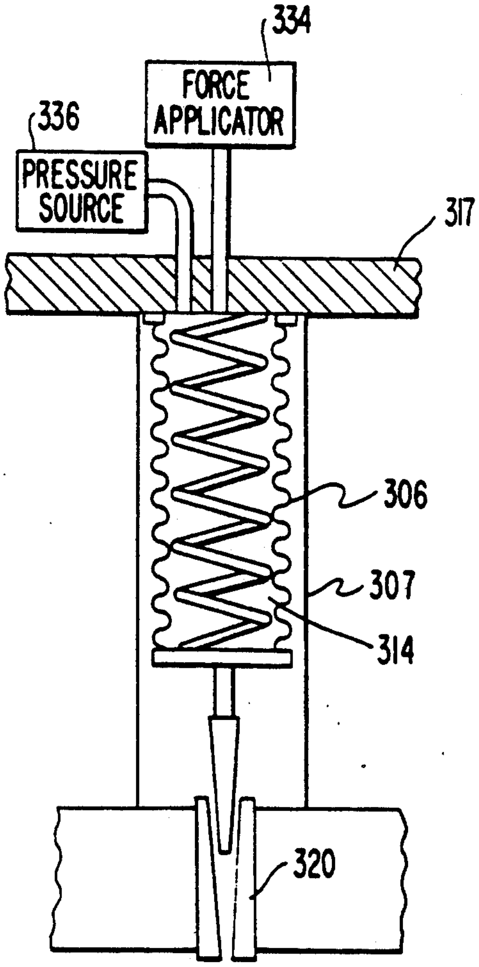
FIG. 13*b* is a view similar to FIG. 13*a* showing the sealed volume positioned inside the bellows.

It is also within the scope of this invention for the connecting member 322 to comprise little more than an internal bellows guide within the bellows chamber 314 and an operating force applied by simply pressurizing or depressurizing the bellows chamber 314 with a fluid, such as a compressed gas or hydraulic fluid, from a pressure source depicted schematically at 336 in FIG. 13 passing through an opening in the vessel wall 317 from a control position outside of the vessel. In the embodiment of FIG. **13*b*, the external pressure supplied from pressure source 336 tends to extend the bellows 306 and chamber 314 and the vessel pressure and/or biasing spring 316 tends to compress or shorten the sealed bellows chamber 314. The biasing spring 316 can be positioned within the bellows chamber 314 completely separated from the vessel fluid 310. The sealed chamber can also be formed outside of the bellows 306, as shown by the sealed chamber 315** of the embodiment in FIG. 13*a*. The valves of FIGS. 13*a* and 13*b* are set up to work inside of a pressure vessel. The bellows 306 can be used as the actuator to overcome its own spring force. Suitable firm stops can also be provided on the bellows and diaphragm seals to prevent travel beyond the needed or intended limits to thereby prevent unnecessary damage or wear to these flexible seals.

Designs of the valve portions of the valves of the present invention in addition to the valve portions previously described can be used in valves of the present invention, and examples thereof are shown in FIGS. 14–17.

Figure 14:
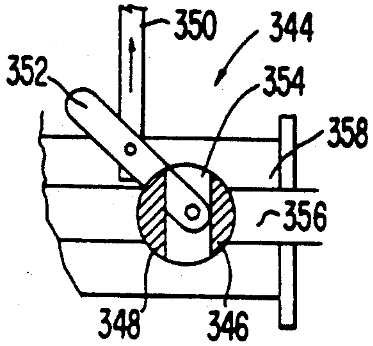
FIG. 14 is a sectional view of a ball-type valve of the present invention illustrated in a closed position.
Figure 15:
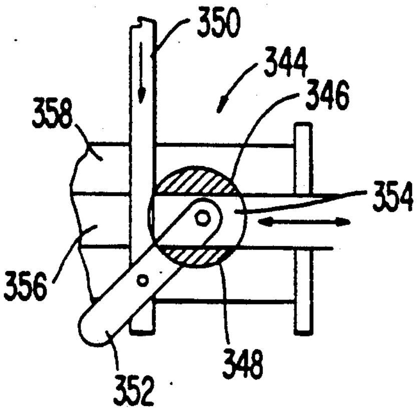
FIG. 15 is a view of the ball-type valve of FIG. 14 illustrated in an open position.

Referring to FIGS. 14 and 15 another valve apparatus of the present invention is shown generally at 344, and it includes a rotatable valve element such as a plug or ball 346 that is rotatable in a cavity 348. Examples of other rotatable ball valves are shown in U.S. Pat. Nos. 4,304,252 and 4,650,157. The valve ball 346 is rotated by longitudinally moving an elongated rod member 350. A linking lever member 352 is pivotally connected at one end to the ball 346 and pivotally connected at another point to the elongated rod member 350. Upward movement of the connecting rod member 350 produced by a suitable actuator mechanism draws the linking lever member 352 upward to rotate the ball 346 into a closed position, as shown in FIG. 14. This actuator mechanism can, for example, be that described or illustrated in FIG. 9. When in the closed position, the passageway 354 through the ball 346 is perpendicular to the passageway 356 of the valve support structure 358. Moving the connecting rod member 350 downward, as shown in FIG. 15, moves the linking lever member 352 downward as well and thereby rotates the ball 346 into the open position wherein the ball passageway 354 is aligned with the passageway 356 through the valve support structure 358. In lieu of the ball configuration any other suitable type of rotating element, such as a disc, can be used.

Figure 16:
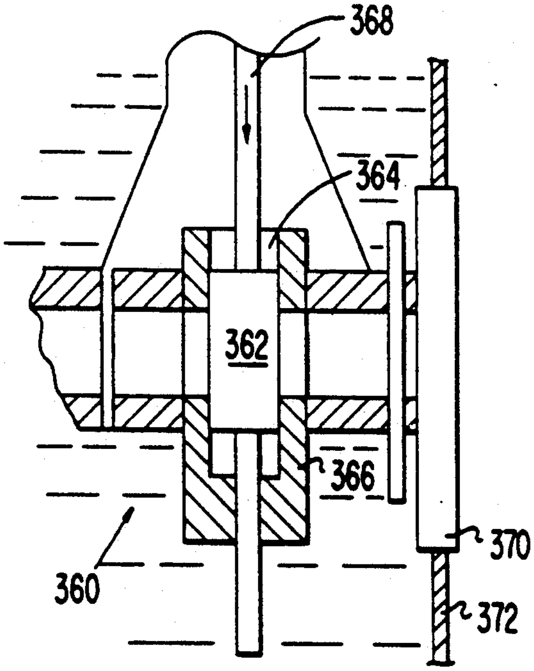
FIG. 16 is a sectional view of a gate valve of the present invention illustrated in a closed position.
Figure 17:
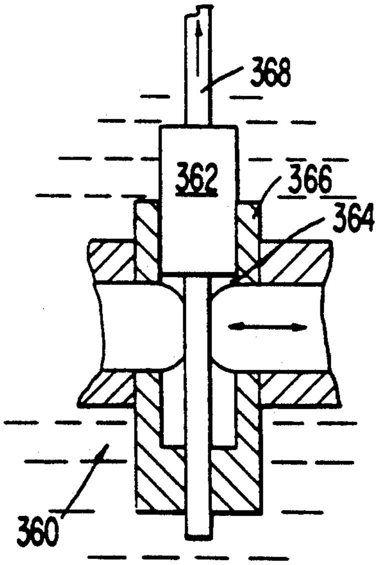
FIG. 17 is a view of the gate valve of FIG. 16 illustrated in an open position.

FIGS. 16 and 17 illustrate an alternative valve apparatus as shown generally at 360 which includes a sliding valve element 362. Examples of known sliding gate valves are shown in U.S. Pat. Nos. 2,606,571 and 4,052,036. The sliding valve element 362 is moved vertically with respect to a cavity 364 formed in a cavity forming structure 366 between a closed position as illustrated in FIG. 16 and an open position as illustrated in FIG. 17. This movement is effected by vertically moving a rod or connecting member 368 which is operatively attached to a suitable internal actuator, such as is shown in FIG. 9. FIG. 16 also shows a thickened boss 370 welded into the shell 372 of the vessel. This integral boss 370 can be used for mounting and attaching the internal valve apparatus to the vessel in lieu of the flange system as shown for example in FIGS. 1 and 5.

The internal valve designs described herein satisfactorily address the problems of vulnerability, thereby making the valve as reliable and immune to damage as is the containment vessel to which it is attached by its placement within the vessel walls and by providing external control functions. The natural shielding of the vessel shell wall eliminates the need for additional heavy shielding for the valve. Also, the probability of physical abuse by a workman or by vandals is minimized since this valve is mounted within the protective envelope of the vessel.

The flexible (diaphragm or bellows) seals of these nozzles eliminate the need for packing glands or other seals with rubbing surfaces and thereby remedy the problem of seal and packing gland leakage which is particularly important when dealing with hazardous and/or obnoxious substances. A highly reliable secondary seal is also provided and protects against the failure of the primary seal as a part of the actuator movement system.

The valves of the present invention can be readily configured to provide a fail closed operation independent of the vessel pressure, flow rate and downstream pressure. This satisfies the need for valves on process, storage and transportation vessels which are closed when no demand for field delivery is being made, as during process shutdown or actual transportation. Furthermore, the valve can be readily configured to provide a fail open, or hold last position characteristics, as needed, for example on process vessels or safety release vents. The valve designs of this invention can be activated by remote controls, automatic controls, or manual controls. They further can be adapted to be powered by human muscle, pressurized fluid, vacuum, electricity, heat, electromagnetic force and/or the pressure or temperature of the product contained in the vessel system itself.

The valve devices described herein thus are designed to be installed completely within the protective envelope of their pressure chambers and yet to be completely controllable from outside of the pressure vessel. The designs thereof need not and do not permit any trace leakage of the contained material to the outside of the vessel through the control mechanism communicating with the outside. By installing the entire valve mechanism and actuator totally within the protective envelope of the vessel, the valve and actuator system is made as immune to damage by external causes as the vessel itself is.

In summary, the valve actuators of this invention consist in essence of impermeable seals, preferably metal, sufficient in strength to withstand both the internal and external pressures which may be applied to it, and having a sufficient and flexible area to withstand without undue fatigue the normal flexure movement of the valve. This seal can take the form of a bellows or a diaphragm. The seal is arranged so that it always forms an impenetrable barrier to the passage of (fluid) material between the vessel and the control chamber. The seal can be attached by any convenient means, such as a stem or ratchet system, to the valve plug or port so that motion of the seal is transferred to the valve plug or port to open or close the valve. The connecting system can, but need not, provide a mechanical advantage to amplify the force or amplitude of the moving seal or to convert its linear motion into rotary motion, as by a rack and pinion gear drive, a ratchet, a lever or a hydraulic system.

The motion is imparted to the system by the use of positive or negative pressure or force applied to the control chamber outside of the seal in order to move the seal to another position. This force can be supplied by diretly introducing a pressurized control fluid into the control chamber from the outside or by means of a direct mechanical linkage or control rod to the outside or preferably by means of a hydraulic cylinder and piston arrangement or electric gear motor arrangement contained entirely within the control chamber and pressurized or energized from the outside via suitable port(s). The bellows, which is preferably of a multi-ply design, can be used as the seal in high pressure applications. The diaphragm, which is also preferably multi-ply, can be used as the seal in lower pressure applications at a somewhat lower cost. The seal is protected from over extension by the design of the apparatus by means of positive stops. The actuator mechanism can be placed at any convenient point in the system, preferably entirely within the envelope of the vessel. The entire actuator mechanism and valve mechanism (if separate) can be designed to be removed from the vessel system, as for maintenance, without personnel entering the vessel. The mechanism is attached to the vessel in such a way that no essential part protrudes beyond the vessel envelope to thereby provide a point of purchase for striking objects. This can be accomplished by means of flush mounting flanges, cover plates or by mounting the mechanism entirely within the vessel or within internal piping of the vessel.

The device is designed preferably so that in its non-energized or relaxed state it is positively closed or open as is appropriate for the particular vessel nozzle. The internal pressure of the containment vessel tends to maintain the valve in its deenergized position. Positive shut off (or opening if desired) of the valve, regardless or whether or not the internal pressure is high, low or even negative, can be provided. Notwithstanding the above however, the device can be designed instead to maintain, once deenergized, the position the valve was last in, if needed.

The valve and/or actuator devices herein can be used with other safety systems including safety relief valves and internal excess flow valves, so as to for example provide an externally adjustable internal excess flow valve or pressure relief valve. Similarly, the valve system can be applied to the relief valve system so that the flow of material to the relief valve can be externally controlled, as for maintenance purposes. It is further within the scope of this invention to provide a remotely adjustable pressure relief valve for the fluid containment vessel.

The system of this invention which includes a vessel, an actuator mechanism and valve members can be manufactured from a wide variety of materials including metals, plastic, polymers, vitreous materials, combinations thereof, and especially heat and corrosion resistant materials such as stainless steels. The specific material or materials selected, as well as their form, depend in part on the chemicals being contained or transported in the vessel and the anticipated conditions of service. Careful considerations should be given in the design to use materials compatible with the environment to which they will be exposed.

The operative force mechanism must have sufficient design power to overcome the opposing internal and/or external pressures, the spring resistance of the seal, which is often substantial, and the ordinary binding and frictional forces of the entire mechanism. Additionally, the design should take advantage of and provide for large flexing surfaces on the sealing device (the bellows or the diaphragm) so that no segment of the flexing surface thereof is stressed to fatigue or permanent distortion. This allows the seal to have a nearly indefinite life.

It will be readily apparent to those skilled in the art that many modifications can be made to this valve design and fall within the scope of this invention. For example, the size, configuration and arrangement of the components can be changed to meet specific requirements. The connecting section can include one or more pivoting links or can be coupled to a rack and pinion gear device or to another hydraulic device, for example, to facilitate the operation, achieve a mechanical transformation or advantage, or simply to better fit into the available space. Also, soft valve components can be readily used in the relatively protected environs of the vessel interior, and this internal placement is safer from a fire standpoint than using the soft valve components externally. The valve can thereby have an extremely tight valve shutoff. The large available force of the actuator can be used to tightly shut off the valve with hard (metal-to-metal or ceramic) valve seats as well, if desired. Additionally an assortment of compression and/or tension springs can be used, as needed, to facilitate the operation of the actuator apparatus.

While this valve apparatus is primarily intended to be installed within the protective envelope of pressure vessels to form an improved material containment system, there are obvious advantages to this valve operator design independent of its interior installation aspect, as would be apparent to those skilled in the art.

Figure 18:
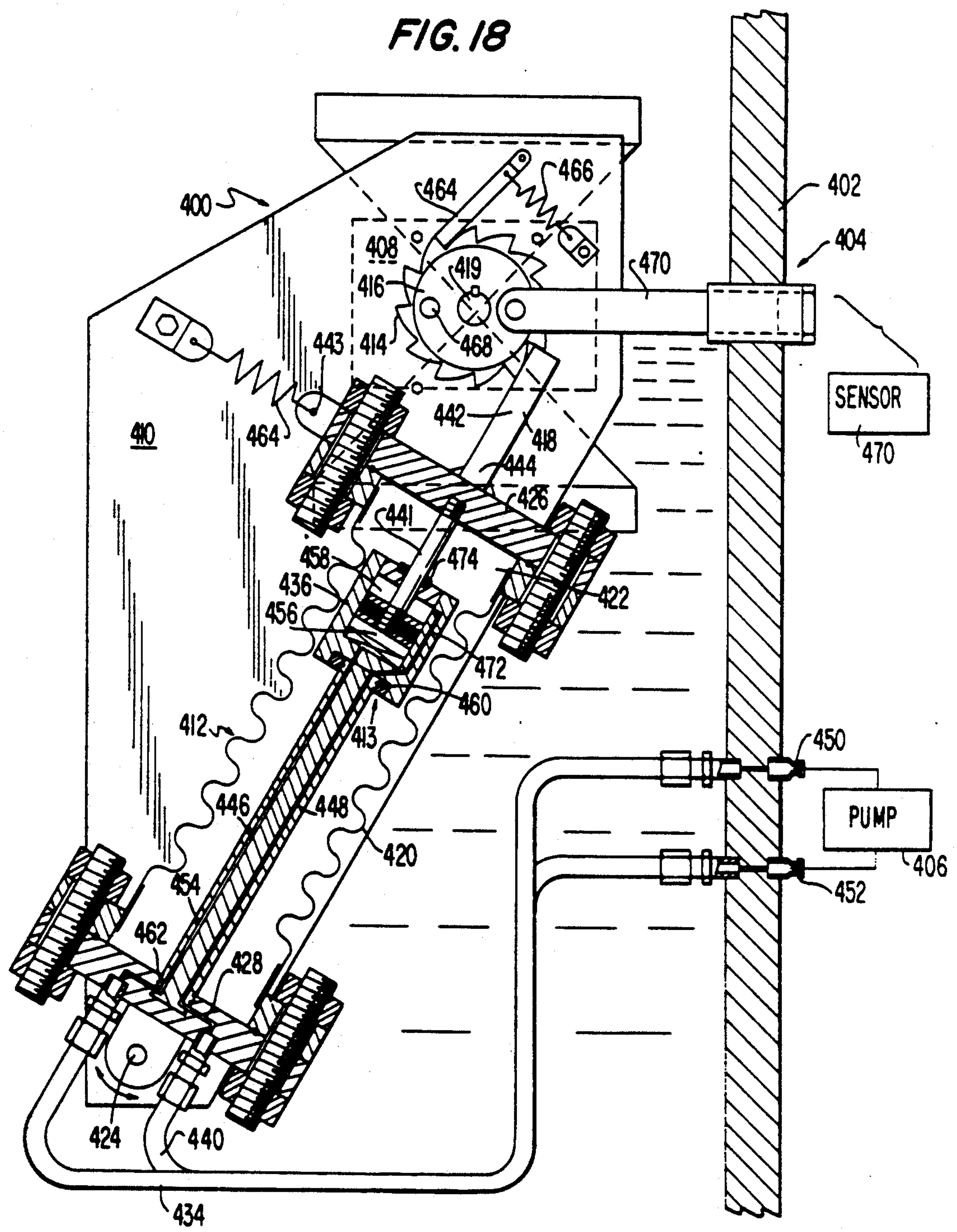
FIG. 18 is a partially sectional view of a rotary valve actuator system of the present invention.

A system of the present invention for controlling rotary elements within pressure vessels is shown generally at 400 in FIG. 18. The system 400 is controlled from outside of the wall 402 of the pressure vessel shown generally at 404 by a pump or other control system shown schematically at 406. It is particularly well suited for rotating internal valves, such as ball or plug valves, as shown generally and schematically at 408. The system 400 is to be mounted within the fluid vessel 404 and to a mounting plate 410 near a wall 402 of the vessel separating the interior of the vessel from its exterior.

This system 400 includes a sealed control chamber assembly shown generally at 412 sealing therein a double acting cylinder shown generally at 413. The double acting cylinder 413 when reciprocated pushes the teeth 414 of a ratchet wheel or spur gear 416 through a connecting or ratchet member 418. The ratchet wheel 416 in turn rotates through a drive shaft 419 the rotatable element or valve 408 to which it is keyed and which is positioned on the opposite side of the mounting plate 410. The ratchet wheel 416 contains a number of teeth 414, which number is preferably evenly divisible by four, when the rotary element 408 is a quarter-turn rotary element, such as a ball, plug or disc valve.

The sealed control chamber assembly 412 includes a sealing bellows 420 of sufficient strength to withstand the fluid pressure in the vessel 404 and of sufficient length and flexibility to allow for the operation over the full stroke length of the double acting cylinder 413 without undue fatigue and over a long and useful life. The sealing bellows 420 seals the interior cavity 422 of the control chamber assembly 412 from fluid communication with the interior of the vessel 404. The sealed control chamber assembly 412 is preferably mounted about a pivot point 424 of the mounting plate 410 at the end most distance from the ratchet wheel 416. The sealed control chamber assembly 412 is shown closed at both ends by flange 426 at the pivot end and flange 428 at the ratchet wheel end, both flanges being gasketed or welded to the bellows 420.

The double acting cylinder 413 includes a cylinder or housing 436 whose cylindrical wall is preferably only slightly smaller than the inside diameter of the bellows 420. The stroke of the double acting cylinder 413 is preferably short, sized to be just sufficient to move the ratchet wheel 416 forward one tooth per cylinder stroke. The shorter the stroke the less resulting fatigue wear and distortion on the bellows 420. The stroke length can be limited, if desired, by an internal travel stop block. The double acting cylinder 413 also guides and supports the reciprocable bellows 420.

Alternatively, the sealed control chamber assembly 412 can be rigidly mounted at the pivot axis 424, and the cylinder 413 itself pivoted within the cavity 422 such as at the end most distance from the ratchet wheel 416. One design positions the housing 436 closer to the tubing end of the bellows 420, and the pivot axis would pass through the piston rod 441 at a location within the flexible portion of the bellows. In this design the bellows 420 itself absorbs the slight sideways bending flexure which occurs with each stroke of the double acting cylinder 413 against the ratchet wheel 416. In this case, the control lines 438 and 440 external to the sealed control chamber assembly 413 can be rigid. Another design of the present invention attaches the spring 464 to the ratchet member 418 after the flange 426, as at point 442 as opposed to point 443, and pivoting can then be around a pivot pin as at 444, and thus pivoting about pivot axis 424 is not needed. This is in contrast to the preferred embodiment wherein the lines must be slightly flexible.

The piston rod 441 of the double acting cylinder 413 is coupled rigidly or flexibly as needed to the inner surface of the forward flange 426 and is preferably aligned with the ratchet member 418, which similarly can be coupled rigidly or flexibly to the exterior surface of the forward flange 426. The control passages 446, 448 communicate the sealed control chamber assembly 412 through the control lines 438, 440, respectively, with the control ports or fittings 450, 452, respectively, at the vessel wall 402. The pumping system 406 then can be removably coupled to the fittings 450 and 452. The control passages extend through the elongated connector member 454 to the two sides or chambers 456, 458, respectively, of the housing 436 of the double acting cylinder 413. The connector member 454 has opposite, threaded connector ends 460 and 462 which are screwed into corresponding threaded openings in the housing 436 and the rearward flange 428, respectively.

A spring 464 (or equivalent biasing means) is secured to the mounting plate 410 at one end thereof and attached to either the sealed control chamber assembly 412 or to the ratchet member 418 such that the ratchet member is biased against the ratchet wheel 416. A "dog" or ratchet pawl 464 is pivotably secured to the mounting plate 410 and is held against the ratchet wheel 416 by a spring 466 or other biasing means. This spring 466 is secured at its opposite end to the mounting plate 410. The pawl 464 prevents the reverse rotation of the ratchet wheel 416 and thereby of the rotary element 408.

Magnets 468 can be mounted on the ratchet wheel 416 and a magnetically transparent blind ended tube 470 positioned so that the magnets 468 pass under it as the ratchet wheel 416 rotates. A magnetic field sensor shown schematically at 470, such as a reed switch, a sensing magnet or a coil, detects the magnets 468 as they pass under the tube 470. This arrangement allows for the sensing of the position of the shaft 419, and therefore of the rotary element 408, from outside of the vessel 404. It can also drive a counting device to record the revolutions of the shaft 419 which could just as readily be driving a positive displacement pump.

The double acting cylinder 413 is operated by alternately pressurizing and depressurizing the control ports or fittings 450, 452 by the pump 406 with a fluid such as a hydraulic fluid or compressed gas. By applying pressure to fitting 452 while depressurizing fitting 450 the piston plate 472 is moved towards the pivot point 424, retracting the control chamber assembly 412 and pulling the ratchet member 418 back to engage with the next tooth 414 of the ratchet wheel 416. When the retraction is sufficient, that is at the bottom of the stroke, the force from the spring 464 pulls the ratchet member 418 into engagement with the next tooth 414 of the ratchet wheel 416. By applying pressure to the fitting 450 and depressurizing the other fitting 452 the piston plate 472 reverses its travel direction and moves away from the pivot point 424. This movement extends the chamber assembly 412 and the ratchet member 418, which is engaged with a tooth 414 of the ratchet wheel 416, and thereby forces the engaged tooth 414 forward, rotating the ratchet wheel 416 slightly. The pawl 464 pivots and latches each tooth as it goes by thereby preventing reverse rotation of the ratchet wheel 416. By repeating this procedure, the system can be made to rotate the drive shaft 419 and the connected rotating element 408 in one rotation direction. The procedure can be readily carried out manually or automatically by an external double acting pump cylinder or by an external series of switching valves controlled mechanically, manually or automatically.

The position of the rotary element 408 can be readily determined from outside of the vessel 404 as previously described. The rotation stops positively whenever the reciprocating procedure stops, thereby holding the rotary element 408 at its last position. This can be advantageous in some control situations.

Also, if the seal of the bellows 420 fails there is no resulting leakage past the highly reliable seal 474 of the double acting cylinder 413, nor is the system thereby rendered inoperable. Other sealed actuator devices, such as those illustrated herein in FIGS. 5-10, can be substituted with similar results, if desired.

The available actuator force can be used to achieve a relatively tight valve shutoff with hard (metal-to-metal or ceramic) valve seats as well. An assortment of compression and/or tension springs can be used to facilitate the operation of the actuator system under special conditions. Further, the actuator can be used to power or manipulate other devices within sealed vessels or enclosures, such as pumps, compressors, mixers, metering devices and the like. While this actuator is primarily intended for installation within the protective envelope of a pressure vessel such as that designated by reference numeral 404 to define a better material containment system, there are obvious advantages to this valve and actuator assembly independent of an interior installation.

This actuator design, using a bellows or similar flexible element, can be readily adapted for use outside of a vessel. Its all metal, totally sealed design provides greatly improved protection for actuators, such as that designated by reference numeral 408, in adverse environments exterior to vessels, such as under water, in corrosive environments, in outer space, in vacuums and in extraordinarily dirty or abrasive environments. Its design is intrinsically able to withstand higher pressures and temperatures than can conventional actuators.

The forces available from this actuator design make all metal construction thereof possible. The actuator need not use conventional flexible materials such as rubber, chlorofluorocarbons, plastics, fibrous materials, polymers and so forth. It also need not incorporate a double acting cylinder using O-rings for it to function. Additionally, it need not use gaskets or O-rings if properly assembled or if welded after assembly. Its force output, however, can be large enough to produce deforming or sealing pressures on valve elements of all metal construction thereby achieving a highly reliable, fire safe valve and/or a valve adaptable for extreme conditions of environment incompatible with the soft materials typically used for valve sealing. Additionally, since no packing glands are required, there are no associated packing gland problems.

Figure 19:
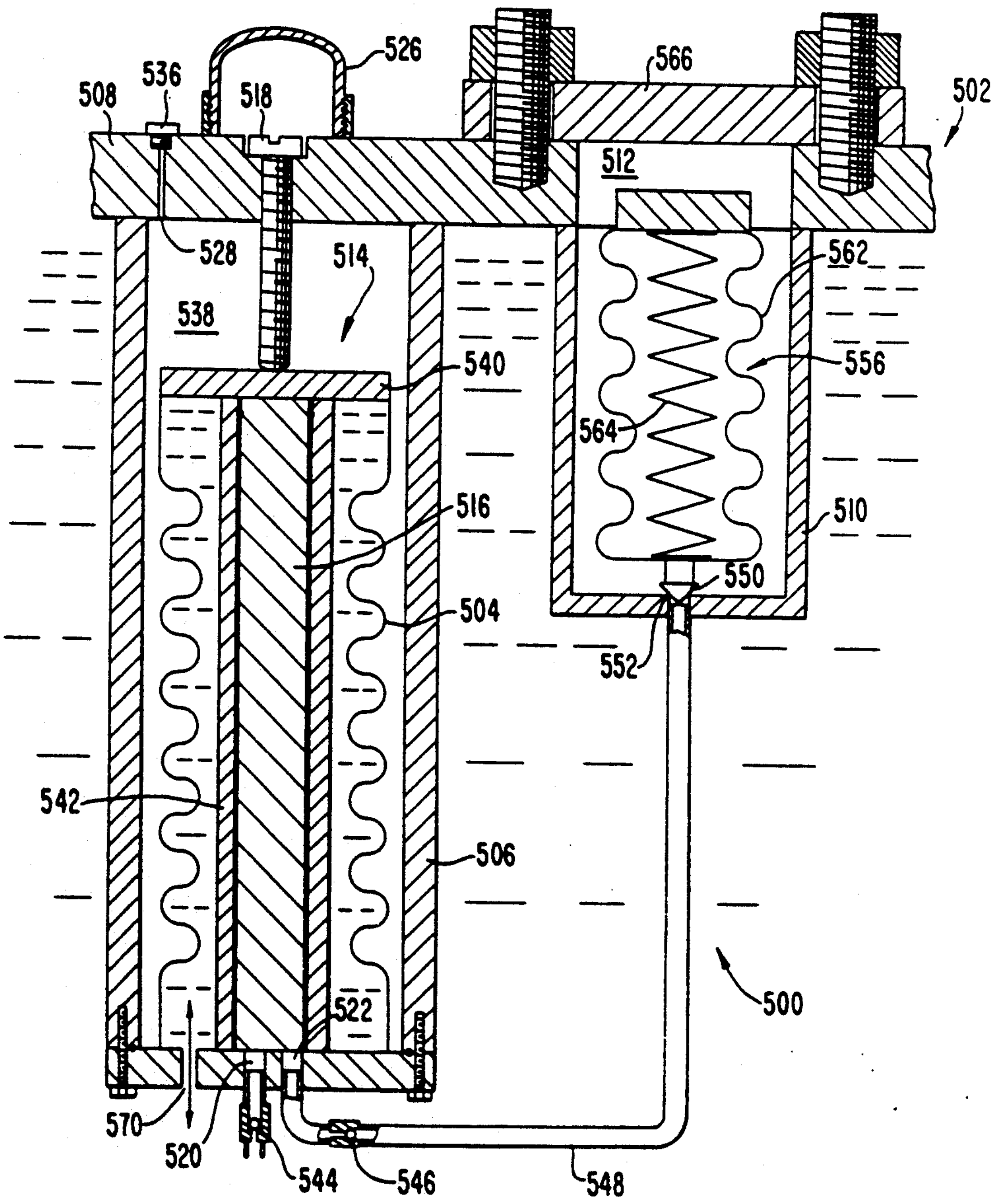
FIG. 19 is a cross-sectional view of an internal safety valve and positive displacement metering pump system of the present invention shown in a transport mode.

Referring to FIG. 19, an alternative embodiment of the internal valve system of the present invention is illustrated generally at 500. System 500 comprises an internally-located, externally-controllable positive displacement pump and metering system. The system 500 can also function as a valve requiring a continuous "signal" motive force from outside of the fluid containment vessel shown generally at 502 for the fluid product to follow, thereby providing a fail safe shutoff for the vessel in a loading procedure. This system 500 does not need any primary mechanical seals or packing. Since the sealing is accomplished with a compressed bellows or diaphragm 504, there are also no packing gland or seal leakage problems.

Figure 20:
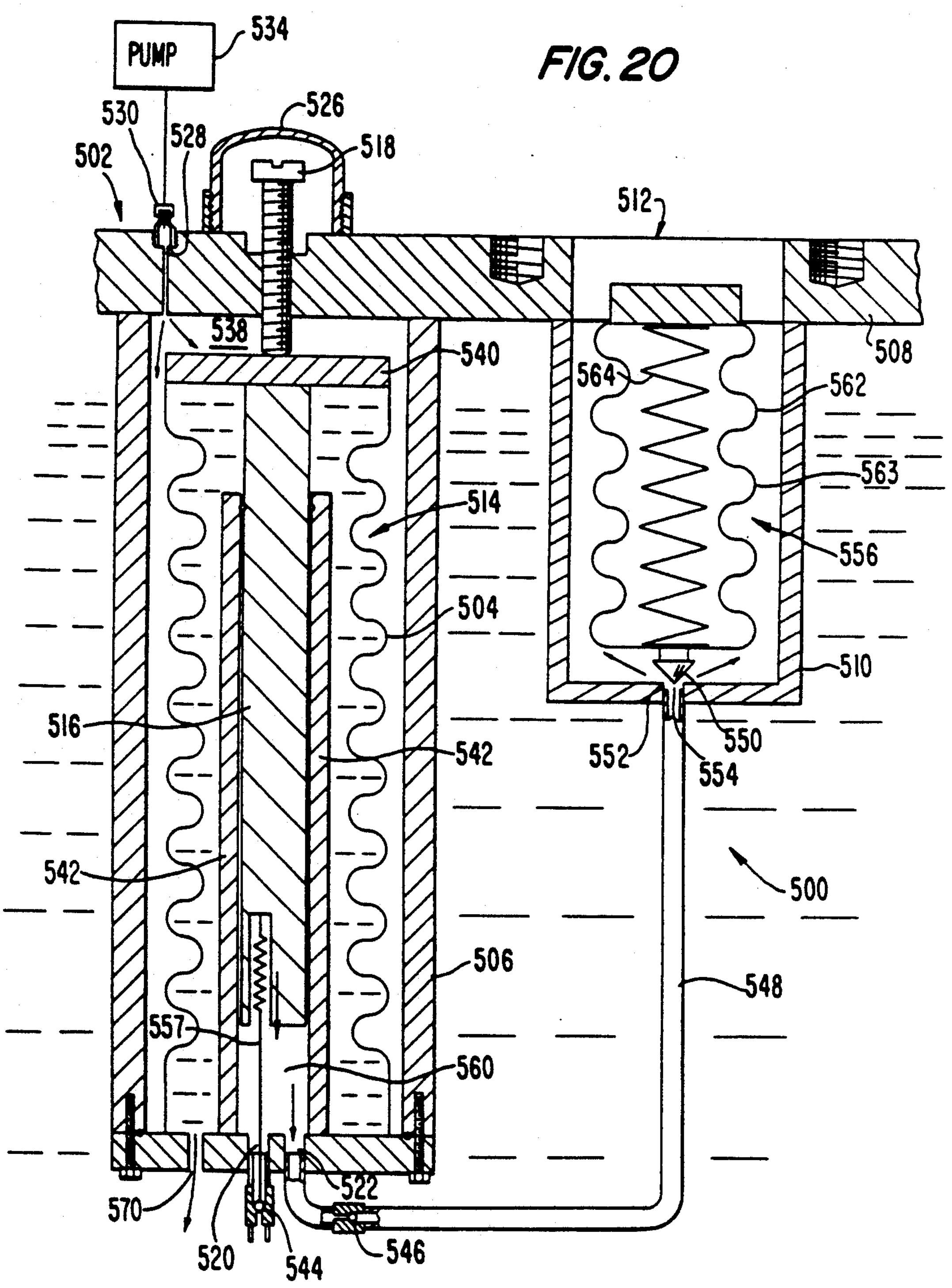
FIG. 20 is a view of the system of FIG. 19 shown in an operative mode.

As shown in FIGS. 19 and 20, first cylindrical vessel 506 is secured to the inside of the vessel wall 508 and a second smaller cylindrical vessel 510 is secured to the vessel wall 508, spaced from the first vessel 506 and at an outlet 512 through the vessel wall 508. A bellows pump assembly shown generally at 514 and which includes bellows 504 is positioned in the first vessel 506. The stroke length of the cylinder pump or piston 516 of the assembly 514 can be adjusted by screwing stroke adjusting screw 518 relative to the vessel wall 508 thereby limiting or adjusting the travel length of the cylinder pump 516. During transit of the vessel, this screw 518 can be screwed all the way flush with the vessel wall 508, as shown in FIG. 19, to be better protected from impact. When screwed down all the way a tight closure of the inlet and outlet ports 520, 522 provided at the bottom of the first vessel 506 is made thereby creating a good internal seal. Optional sealing surfaces (not shown) can be installed or machined into the bottom of the pump cylinder 516 and mate with surfaces on the bottom of the piston 524. A safety cap 526 is also provided for this stroke adjusting screw 518 to provide a tertiary seal in the remote event of the failure of the bellows 504 and of the adjusting screw.

A port of passageway 528 passing through the vessel wall 508 is capped with a fitting 530, and the two way passage of motive/signal fluid from a pump or similar fluid or pressure source shown schematically at 534 in FIG. 20 can flow therethrough. This pressure source would typically be a compressed gas or hydraulic fluid. When not in use this port 528 is sealed with a plug, screw, flange or two-way hydraulic fitting shown at 536 in FIG. 19. Pressure fluid when pumped by pump 534 enters the cavity 538 around the bellows 504 and inside of the first vessel 506 and thereby compresses the bellows 504. This compression drives the (optional) piston 540 (of the pump cylinder 516) downward in its guide cylinder 542. The cylinder 542 and piston 540 guide the movement of the bellows 504 and also generate a mechanical advantage for the bellows pump assembly 514. Other guiding arrangements as would be apparent to those skilled in the art can additionally or alternatively be provided.

Passageway 570 passes through the wall of the first vessel 506 and allows fluid product to flow between the inside of fluid containment vessel 502 and the cavity between the bellows 504 and the cylinder 542. Passageway 570 thereby allows the pressure of the fluid product within the fluid containment vessel 502 to flow into the cavity between the bellows 504 and the cylinder 542 and balancing the movement of the piston 540 with the pressure of the fluid within cavity 538. When pump 534 is not pumping fluid into cavity 538, the pressure within the fluid containment vessel (and hence the cavity between the bellows 504 and the cylinder 542) will be greater than the pressure within cavity 538, causing the piston 540 to move toward and abut against screw 518. When pump 534 is pumping fluid into cavity 538, the pressure within cavity 538 will be greater than the pressure within the cavity between the bellows 504 and the cylinder 542, causing the piston 540 to move away from the screw 518.

During the down stroke of the pump cylinder 516, an inlet check valve 544, such as a ball or flapper valve, associated with the inlet port 520 closes and an outlet ball check valve 546 associated with the outlet port 522 opens. The fluid product is then forced from the first vessel 506 through the tubing or conduit 548 to the second vessel 510. This forcing of the fluid through the tubing 548 lifts the valve member or plug 550 off of its valve seat 552 thereby opening the port 554 at the bottom of the second vessel 510 and allowing the fluid to pass into the second vessel 510, as best depicted in FIG. 20. A spring bellows relief assembly shown generally at 556 is positioned in the second vessel 510 on top of the valve member 550 and is set, for examples at one hundred and fifty percent of the working pressure of the fluid in the vessel 502. The spring bellows relief assembly 556 then, when the pump cylinder 516 is not pumping, holds the valve member 550 down tightly against the valve seat 552 in a closed position.

When the compressed driving fluid is released out through the port or outlet 512 in the vessel wall 508, the system relaxes. The outlet check valve 546 closes and the inlet check valve 544 opens allowing more fluid product in to the cavity 560 of the cylinder area, as best shown in FIG. 20. The second vessel 510 thereby serves as a one-way check valve for the removal of the fluid product from the vessel 502. The bellows 562 of the spring bellows relief 556 assembly protects the spring 564 thereof used to keep the valve member or plug 550 in place in its closed position at the bottom of the second vessel 510 at the port 554. The spring 564 is sized so that the valve member 550 cannot open within the working pressure of the vessel itself, as previously disclosed, but can be opened only when additional pressure is positively provided by the pump cylinder 516. If the outlet port 554 is also used for filling operations then the spring bellows relief assembly 556 is removed from the second vessel 510. For this procedure check valve 546 is omitted, check valve 544 is equipped with a connecting member, such as a spring 557 (FIG. 20), between the check valve plug (ball) and the pump piston 516 to hold the port open when the piston is fully retracted. Removal of the spring bellows relief assembly 556 also provides easy access to the renewable valve seat 552 at the bottom of the second vessel 510. This valve seat 552 can thus be serviced even when the fluid containment vessel 502 has pressure in it since the pump itself can be made to act as a valve as described above.

A cap or removable blind illustrated in FIG. 19 by numeral 566 is provided for securing over the outlet 512 when this system 500 is not being operated, and removed therefrom for system operation, as shown in FIG. 20. Flange 566 can be recessed into the vessel wall 508 or located in a recessed well (not shown) to be better protected.

The pump can be designed to have high or low capacity and can generate a wide range of pressures. This design can be modified to allow the entire system to be removed from the vessel for servicing without actually entering the fluid containment vessel. For optimum protection, however, the entire system is mounted inside of the pressure vessel, as shown in the drawings.

Although the valves of the present invention were designed to operate in vessels, such as hydrogen sulfide cars and trucks, having pressures of four hundred to five hundred psig, they can be used for pressure ranges from full vacuum to about five thousand psig. For transportation applications, however, the most important range is from one hundred to one thousand psig, or generally above two hundred and fifty psig. In comparison, the typical diaphragm-operated valves develop problems when the pressures thereon exceed about twenty-five psig. Some though are constructed so that they can theoretically withstand pressures up to about one hundred and fifty psig. Their manufacturers, however, do not contemplate them being installed inside pressure vessels. The present valves can thus be effectively used to dispense fluid from one high pressure system to another.

Since the present valves operate in high pressure environments, they must develop large mechanical advantages and be able to withstand high stresses. These advantages, to allow operation of the valves under high pressures of hundreds of psi, are provided herein by pistons and cylinders, flexible diaphragms, and/or flexible bellows operated hydraulically, pneumatically or thermally. High hydraulic pressures and/or favorable ratios of working surface in the operator versus the valve plug develop high forces. A valve motor which uses a rack and pinion wheel to develop a high advantage in combination with a cylinder can also be used. Rods and levers can be used but less advantageously; for example, a control rod coming directly from the outside having its mechanical advantage developed by a screw can be used. The magnetic/electromagnetic valves are somewhat different however, since they use pilot control devices to create high pressure gradients with the product fluid itself and then use a piston cylinder arrangement to move the valve. Another valve of this invention uses electrically-operated actuator valves used for atmospheric uses and provides a housing according to this invention so that the valve can be used inside pressure tanks.

For each of these valves, operator sealing means which are independent of the function of the mechanical seal alone are provided. The sealing systems herein when used in these pressure systems are superior to packing seals, since packing seals leak, are subject to frictional wear and depend on tight clearances between rubbing parts to seal. Frictional wear, impact, abuse and even changes in temperature can cause these tight clearances to expand thereby defining a larger leak path for product to exit the vessel through the packing. For many commodities which have no significant odor or are non-hazardous in small concentrations, this can be "acceptable". However, for hydrogen sulfide, mercaptans, chlorine, ammonia, sulphur dioxide, hydrogen fluoride, hydrogen chloride, radioactive materials, nerve gases, high purity substances, disease causing substances, high value substances and the like, even small leaks during transportation are undesirable. Since full barrier membranes (flexible or inflexible) are included in the present valves to positively stop this leakage and to positively stop leakage or control fluid into the product, packing seals are advantageously not needed. In other words, no frictional or packing type of seal is needed to isolate the actuator from the product, rather an impermeable seal such as a bellows, diaphragm or rigid tube is used.

The valves herein preferably do not extend any distance beyond the tank bottom or the tank top. Rather, they are completely internal or recessed, including the stationary components thereof, and even the cover flanges and fasteners therefor are flush mounted. The valves are therefore less subject to impact or other destructive forces, which is especially advantageous when the valve is to be mounted on a transportation vessel carrying hazardous materials at high pressures. Additionally, the control system is protected by having no part thereof protruding beyond the protective envelope defined by the smooth vessel wall. This can be accomplished by removing the external parts, such as the control rod in the hydraulic pump, during transportation. Preferably though all critical parts of the control system and the valve(s) are installed entirely inside of the outer wall envelope of the vessel, as for example in a closed well with a flush mounting cover having a strength at least equal to that of the vessel wall itself. Ready means for remotely controlling the valve, such as when the top valve is controlled from the bottom of the car, can thereby be provided. The control systems can also be protected with one or more quick connect hydraulic fittings. Even the hydraulic pump can be installed, if desired, inside such a well though the present design does not make this necessary. Thus, there is no dependency on "sheer zones" or "sheer off" points on portions of the valve or control external to the vessel since there are no such points or zones. Also, no discharge piping is left in place during transportation if such piping is external to the vessel wall envelope or the well itself.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. An internal pump assembly comprising:
a fluid tank defining a fluid compartment;
a first vessel positioned in said fluid tank;
a second vessel positioned in said fluid tank, said second vessel including a second vessel port through which fluid can flow relative to said fluid compartment; and
bellows pump means positioned at least partially in said first vessel for pumping fluid from said fluid compartment through said second vessel port into said second vessel from which the fluid can be subsequently removed;
wherein said bellows pump means includes a bellows pump movable between a first position wherein fluid is being pumped to said second vessel and a different second position;
wherein said bellows pump includes a bellows surface on which fluid pressure of said fluid compartment acts to thereby bias said bellows pump towards the second position;
wherein said bellows surface has an inwardly-disposed inside surface and an opposite outside surface; and
wherein said first vessel has a passageway through which fluid of said fluid compartment can flow to thereby act directly on said inside surface and bias said bellows pump towards one of the first and second positions.

2. An internal pump assembly comprising:
a fluid tank defining a fluid compartment;
a first vessel positioned in said fluid tank;
a second vessel positioned in said fluid tank, said second vessel including a second vessel port through which fluid can flow relative to said fluid compartment; and
bellows pump means positioned at least partially in said first vessel for pumping fluid from said fluid compartment through said second vessel port into said second vessel from which the fluid can be subsequently removed;
wherein said bellows pump means includes a bellows assembly, a cylinder-pump mechanism positioned in said bellows assembly, and a conduit providing fluid communication between said cylinder-pump mechanism and said second vessel port.

3. The internal pump assembly of claim 2 wherein said bellows pump means includes check valve means for stopping the flow of fluid in said conduit from said second vessel to said cylinder-pump mechanism.

4. The internal pump assembly of claim 2 wherein said cylinder-pump mechanism includes a pump chamber and a fluid passageway through which fluid can flow from said fluid compartment into said pump chamber, said cylinder-pump mechanism pumping fluid from said pump chamber into said conduit.

5. The internal pump assembly of claim 2 wherein said cylinder-pump mechanism includes a cylinder, a piston and a cylinder pump chamber.

6. The internal pump assembly of claim 5 wherein said cylinder is disposed within said bellows assembly.

7. The internal pump assembly of claim 5 wherein said cylinder pump chamber is disposed in said first vessel.

8. The internal pump assembly of claim 5 wherein said piston reciprocates in said cylinder.

9. The internal pump assembly of claim 2 wherein said cylinder-pump mechanism guides the movement of said bellows assembly.

10. An internal pump assembly comprising:
a fluid tank defining a fluid compartment;
a first vessel positioned in said fluid tank;
a second vessel positioned in said fluid tank, said second vessel including a second vessel port through which fluid can flow relative to said fluid compartment;
bellows pump means positioned at least partially in said first vessel for pumping fluid from said fluid compartment through said second vessel port into said second vessel from which the fluid can be subsequently removed;
a valve member generally at said second vessel port and positionable between an open positon and a closed position, said bellows pump means when pumping fluid to said second vessel moving said valve member to the open position;
biasing means removably positioned in said second vessel for biasing said valve member to the closed position; and
check valve means for preventing the flow of fluid through said second vessel port to said first vessel when said biasing means is removed from said second vessel.

11. The internal pump assembly of claim 10 wherein said biasing means comprises a spring bellows relief assembly.

12. An internal pump assembly comprising:
a fluid tank defining a fluid compartment;
a first vessel positioned in said fluid tank;
a second vessel positioned in said fluid tank, said second vessel including a second vessel port through which fluid can flow relative to said fluid compartment; and
bellows pump means positioned at least partially in said first vessel for pumping fluid from said fluid compartment through said second vessel port into said second vessel from which the fluid can be subsequently removed;
wherein said first and second vessels are both positioned in said fluid compartment and at least partially surrounded by the fluid therein.

13. An internal pump assembly comprising:
a fluid tank defining a fluid compartment;
a first vessel positioned in said fluid tank;
a second vessel positioned in said fluid tank, said second vessel including a second vessel port through which fluid can flow relative to said fluid compartment; and
bellows pump means positioned at least partially in said first vessel for pumping fluid from said fluid compartment through said second vessel port into said second vessel from which the fluid can be subsequently removed;
wherein said bellows pump means includes a bellows pump movable between a first position wherein fluid is being pumped to said second vessel and a different second position;
wherein said bellows pump means includes a bellows having a bellows inside surface; and
wherein said first vessel has a port through which fluid pressure of said fluid compartment passes to impact said bellows inside surface and thereby bias said bellows pump towards the second position.

14. An internal pump assembly comprising:
a fluid tank defining a fluid compartment for a containing a fluid therein;
a first vessel positioned in said fluid compartment, said first vessel having a first fluid entry port for the entry of the fluid from said fluid compartment and a first fluid exit port for the exit of the fluid from said first vessel;
a second vessel positioned in said fluid compartment, said second vessel having a second fluid entry port for the entry of the fluid from said first vessel and said fluid compartment;
a conduit providing fluid connection of said first fluid exit port with said second fluid entry port; and
bellows pump means positioned at least partially in said first vessel for pumping the fluid in said fluid compartment into said first vessel, out of said first vessel, through said conduit and into said second vessel.

15. The internal pump assembly of claim 14 wherein said bellows pump means includes a bellows pump movable between a first position wherein fluid is being pumped to said second vessel and a different second position, said bellows pump including a bellows surface on which fluid pressure of said fluid compartment acts to thereby bias said bellows pump towards the second position.

16. The internal pump assembly of claim 15 wherein said bellows surface has an inwardly disposed inside surface and an opposite outside surface, and said first vessel has a passageway through which fluid of said fluid compartment can flow to thereby act directly on said inside surface and bias said bellows pump towards one of the first and second positions.

17. The internal pump assembly of claim 14 wherein said second vessel includes a valve member movable between an open position wherein said second fluid entry port is open and a closed position wherein said second fluid entry port is closed.

18. The internal pump assembly of claim 17 wherein said bellows pump means when actuated moves said valve member to the open position.

19. The internal pump assembly of claim 17 further comprising spring bellows relief means positioned in said second vessel for biasing said valve member to the closed position against the working pressure of the fluid in said fluid compartment.

20. The internal pump assembly of claim 14 further comprising pumping means positioned outside of said fluid tank for pumping fluid relative to said first vessel to thereby actuate said bellows pump means.

21. The internal pump assembly of claim 14 wherein said bellows pump means includes a bellows assembly and a cylinder-pump mechanism positioned in said bellows assembly, and said conduit providing fluid communication between said cylinder-pump mechanism and said second fluid entry port.

22. The internal pump assembly of claim 21 wherein said bellows pump means includes check valve means for stopping the flow of fluid in said conduit from said second vessel to said cylinder-pump mechanism.

23. The internal pump assembly of claim 21 wherein said cylinder-pump mechanism includes a pump chamber in fluid communication with both said first fluid entry port and said first fluid exit port.

24. The internal pump assembly of claim 23 wherein said cylinder-pump mechanism pumps fluid from said pump chamber into said conduit.

25. The internal pump assembly of claim 24 further comprising check value means for preventing the flow of fluid from said second vessel through said conduit and into said pump chamber.

26. The internal pump assembly of claim 14 further comprising a valve member generally at said second fluid entry port and positionable between an open position and a closed position, and said bellows pump means when pumping fluid to said second vessel moving said valve member to the open position.

27. The internal pump assembly of claim 26 further comprising biasing means removably positioned in said second vessel for biasing said valve member to the closed position.

28. The internal pump assembly of claim 27 further comprising check valve means for preventing the flow of fluid through said second fluid entry port to said first vessel when said biasing means is removed from said second vessel.

* * * * *